United States Patent
Li et al.

(10) Patent No.: US 11,290,214 B2
(45) Date of Patent: Mar. 29, 2022

(54) DATA PROCESSING METHOD AND DEVICE

(71) Applicant: HUAWEI TECHNOLOGIES CO., LTD., Guangdong (CN)

(72) Inventors: Nijun Li, Shanghai (CN); Yanbo Yang, Shenzhen (CN); Yuejun Wei, Shanghai (CN); Lian Li, Shanghai (CN); Xin Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/587,910

(22) Filed: Sep. 30, 2019

(65) Prior Publication Data
US 2020/0028626 A1   Jan. 23, 2020

Related U.S. Application Data

(63) Continuation of application No. PCT/CN2017/079327, filed on Apr. 1, 2017.

(51) Int. Cl.
| | |
|---|---|
| *H04L 1/16* | (2006.01) |
| *H04L 1/00* | (2006.01) |
| *H04W 28/06* | (2009.01) |
| *H04W 80/02* | (2009.01) |
| *H04L 5/00* | (2006.01) |

(52) U.S. Cl.
CPC .......... *H04L 1/1642* (2013.01); *H04L 1/0045* (2013.01); *H04L 5/0055* (2013.01); *H04W 28/06* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2004/0081248 A1 | 4/2004 | Parolari | |
| 2007/0047486 A1* | 3/2007 | Lee | H04W 74/002 370/329 |
| 2008/0240011 A1* | 10/2008 | Kim | H04L 1/0072 370/312 |
| 2012/0300614 A1 | 11/2012 | Ha | |

(Continued)

FOREIGN PATENT DOCUMENTS

| | | |
|---|---|---|
| CN | 102104535 A | 6/2011 |
| CN | 102265700 A | 11/2011 |
| CN | 102273151 A | 12/2011 |

(Continued)

OTHER PUBLICATIONS

Supplementary European Search Report issued in European Application No. 17903926.8 dated Jan. 24, 2020, 10 pages.

(Continued)

*Primary Examiner* — Peter Chen
*Assistant Examiner* — Jeff Banthrongsack
(74) *Attorney, Agent, or Firm* — Fish & Richardson P.C.

(57) ABSTRACT

The present disclosure relates to data processing methods and devices. One example method includes obtaining N correctly received radio link control (RLC) protocol data units (PDUs) in a packet data convergence protocol (PDCP) PDU, and generating the PDCP PDU based on the N correctly received RLC PDUs, where the PDCP PDU includes M RLC PDUs, N and M are positive integers, and N<M.

18 Claims, 16 Drawing Sheets

201 — Obtain N correctly received RLC PDUs in a PDCP PDU

202 — Generate the PDCP PDU based on the N correctly received RLC PDUs

(56) References Cited

U.S. PATENT DOCUMENTS

2013/0294379 A1* 11/2013 Guo .................. H04W 72/087
370/329

FOREIGN PATENT DOCUMENTS

| CN | 102469511 A | 5/2012 | | |
|----|----|----|----|----|
| CN | 102547848 A | 7/2012 | | |
| CN | 106304127 A | 1/2017 | | |
| EP | 2086272 A1 | 8/2009 | | |
| EP | 2661051 A1 | 11/2013 | | |
| JP | 2012514952 A | 6/2012 | | |
| KR | 20110099063 A | 9/2011 | | |
| KR | 20110106400 A | 9/2011 | | |
| KR | 20150121206 A | 10/2015 | | |
| WO | 2009023794 A1 | 2/2009 | | |
| WO | 2010080916 A1 | 7/2010 | | |
| WO | WO-2010080916 A1 * | 7/2010 | ............. | H04L 47/10 |
| WO | 2011077039 A1 | 6/2011 | | |
| WO | 2017024581 A1 | 2/2017 | | |

OTHER PUBLICATIONS

Hui Liu et al., "Research and design of PDCP layer in LTE protocol stack," Journal of Chongqing University of Posts and Telecommunications (Natural Science Edition), vol. 23 No. 1, Feb. 2011, 5 pages (with English abstract).

Office Action issued in Chinese Application No. 201780087344.2 dated Nov. 4, 2020, 18 pages (with English translation).

Toseef et al., "LTE system performance optimization by discard timer based PDCP buffer management," 8th International Conference on High-capacity Optical Networks and Emerging Technologies, Feb. 9, 2012, 6 pages.

Yonglong Jin, "The Analysis and Implementation of the PDCP Protocol Stack Based on the Arm Platform in WCDMA System," Information Technology Series of China's Excellent Master's Thesis Full-text Database (Monthly), Nov. 15, 2013, 63 pages (with English abstract).

Extended European Search Report issued in European Application No. 17903926.8 dated May 6, 2020, 10 pages.

Office Action issued in Japanese Application No. 2019-553840 dated Nov. 4, 2020, 6 pages (with English translation).

Office Action issued in Korean Application No. 2019-dated on Nov. 19, 2020, 8 pages (with English translation).

3GPP TS 26.201 V13.0.0 (Dec. 2015), "3rd Generation Partnership Project;Technical Specification Group Services and System Aspects; Speech codec speech processing functions; Adaptive Multi-Rate—Wideband (AMR-WB) speech codec; Frame structure (Release 13)," Dec. 2015, 23 pages.

PCT International Search Report and Written Opinion issued in International Application No. PCT/CN2017/079327 dated Dec. 27, 2017, 18 pages (with English translation).

Office Action issued in Korean Application No. 2019-7030561 dated Feb. 22, 2021, 7 pages (with English translation).

Office Action issued in Japanese Application No. 2019-553840 dated Sep. 7, 2021, 6 pages (with English translation).

* cited by examiner

DATA PROCESSING METHOD AND DEVICE

CROSS-REFERENCE TO RELATED APPLICATIONS

This application is a continuation of International Application No. PCT/CN2017/079327, filed on Apr. 1, 2017. The disclosure of which is hereby incorporated by reference in its entirety.

TECHNICAL FIELD

The present invention relates to the communications field, and in particular, to a data processing method and device.

BACKGROUND

Long term evolution (LTE) user plane protocol stack includes a packet data convergence protocol (PDCP), a radio link protocol (RLC), and a medium access control protocol (MAC). An RLC layer is located between a PDCP layer and a MAC layer. The RLC layer communicates with the PDCP layer by using a service access point (SAP), and communicates with the MAC layer through a logical channel. On a receiving side, one PDCP PDU includes a plurality of RLC PDUs. If at least one of the RLC PDUs included in the PDCP PDU is lost, the MAC layer retransmits the RLC PDU. If the lost RLC PDU cannot be recovered through retransmission, all RLC PDU segments related to the PDCP PDU are discarded. Therefore, subjective experience of a user is affected.

SUMMARY

Embodiments of the present invention provide a data processing method and device, to obtain a complete PDCP PDU based on some correctly received RLC PDUs in the PDCP PDU, thereby improving subjective experience of a user.

According to a first aspect, an embodiment of the present invention provides a data processing method, where the method includes: obtaining N correctly received radio link control RLC PDUs in a packet data convergence protocol PDCP protocol data unit PDU; and generating the PDCP PDU based on the N correctly received RLC PDUs, where the PDCP PDU includes M RLC PDUs, N and M are positive integers, and N<M. The correctly received RLC PDU is an RLC PDU obtained from a correctly received MAC PDU, and the correctly received MAC PDU is a MAC PDU on which a corresponding CRC check is correct.

In this way, the PDCP PDU can be generated based on some correctly received RLC PDUs in the PDCP PDU, and there is no need to assemble all RLC PDUs to obtain the PDCP PDU. Therefore, even if an RLC PDU that does not need to be used is incorrectly received or lost, generation of the PDCP PDU is not affected.

With reference to the first aspect, in a first possible implementation, the generating the PDCP PDU based on the N correctly received RLC PDUs includes: obtaining at least one recovered RLC PDU; and generating the PDCP PDU based on the N correctly received RLC PDUs and the recovered RLC PDU. Because only some RLC PDUs are correctly received, the recovered RLC PDU further needs to be obtained, so that the recovered RLC PDU and the correctly received RLC PDUs are assembled to obtain the PDCP PDU. For example, after an RLC PDU in the PDCP PDU is lost, a recovered RLC PDU is obtained to replace the lost RLC PDU, thereby implementing assembly of the PDCP PDU. Certainly, regardless of whether the RLC PDU is lost or is not lost, a device can obtain the PDCP PDU by assembling only some correctly received RLC PDUs and a recovered RLC PDU.

With reference to the first possible implementation of the first aspect, in a second possible implementation, the generating the PDCP PDU based on the N correctly received RLC PDUs includes: determining whether an RLC PDU in the PDCP PDU is lost; if the RLC PDU in the to-be-assembled PDCP PDU is lost, obtaining at least one recovered RLC PDU, where the recovered RLC PDU is used to recover the lost RLC PDU; and generating the PDCP PDU based on the N correctly received RLC PDUs and the recovered RLC PDU. To be specific, when the RLC PDU is lost, the device uses the recovered RLC PDU as recovery for the lost RLC PDU.

With reference to the first or the second possible implementation of the first aspect, in a third possible implementation, the obtaining at least one recovered RLC PDU includes: obtaining data in a data field, where the data in the data field is data that is in a data field and that is of an RLC PDU type; and obtaining an RLC header. In other words, parts of the RLC PDU are obtained respectively. Therefore, the recovered RLC PDU is generated based on the RLC header and the data in the data field.

With reference to the first or the second possible implementation of the first aspect, in a fourth possible implementation, because a loss of the RLC PDU is caused by an incorrectly received MAC PDU, speech data is obtained from the incorrectly received MAC PDU to be used as data in the recovered RLC PDU. To be specific, the data in the recovered RLC PDU is a speech payload obtained from the incorrectly received MAC PDU. The incorrectly received MAC PDU is a MAC PDU on which a corresponding CRC check is incorrect. An RLC PDU included in the incorrectly received MAC PDU and the lost RLC PDU in the PDCP PDU may be a same RLC PDU.

Although data in the incorrectly received MAC PDU includes an error, the recovered RLC PDU can be obtained based on the data that includes an error. Then, the PDCP PDU to be discarded is reserved based on the recovered RLC PDU. Therefore, a speech data loss is reduced, and subjective experience of speech for a user is improved.

With reference to the third possible implementation of the first aspect, in a fifth possible implementation, the obtaining data in a data field includes: obtaining a target MAC PDU, where the target MAC PDU is a MAC PDU checked as incorrect by using CRC check, and an RLC PDU included in the target MAC PDU is the lost RLC PDU in the to-be-assembled PDCP PDU; and obtaining a speech payload from the target MAC PDU. By performing such an operation, it may be implemented that data in the recovered RLC PDU is a speech payload obtained from one or more incorrectly received MAC PDUs.

With reference to the fifth possible implementation of the first aspect, in a sixth possible implementation, the obtaining a speech payload from the target MAC PDU includes: when the lost RLC PDU is not located at an end location in the PDCP PDU and one RLC PDU is lost, obtaining a length of a speech payload of the lost RLC PDU through calculation based on a length of speech data of the correctly received RLC PDUs and a preset speech frame length; and for the target MAC PDU, extracting, from back to front, a speech payload whose length is equal to the length of the speech payload of the lost RLC PDU. When the lost RLC PDU is not located at the end location in the PDCP PDU and one RLC PDU is lost, speech data of the target MAC PDU corresponding to the lost RLC PDU extends to an end of the target MAC PDU. In this case, after speech data of the lost RLC PDU is obtained, speech data whose length matches the length the speech data of the lost RLC PDU can be obtained from the target MAC PDU in a back-to-front order.

With reference to the fifth possible implementation of the first aspect, in a seventh possible implementation, the obtaining a speech payload from the target MAC PDU includes: when the lost RLC PDU is not located at an end location in the to-be-assembled PDCP PDU, determining a MAC header length of the target MAC PDU; and obtaining the speech payload by removing the MAC header length of the target MAC PDU and a preset RLC header length. In this way, the speech payload of the target MAC PDU may be obtained by removing the header length of the target MAC PDU. This method is particularly applicable to a scenario in which a plurality of RLC PDUs are lost, because it is difficult to determine a speech payload of each lost RLC PDU in this case.

With reference to the fifth possible implementation of the first aspect, in an eighth possible implementation, the obtaining a speech payload from the target MAC PDU includes: when the lost RLC PDU is located at an end location in the to-be-assembled PDCP PDU, determining an end location and a start location of the speech payload in the target MAC PDU; and extracting, based on the start location and the end location, the speech payload from the target MAC PDU. Because a MAC PDU corresponding to the RLC PDU located at the end location includes a MAC header and an RLC header, and a filling bit is located at an end of the MAC PDU, speech data of the target MAC PDU can be obtained by removing both the two types of data at the head and the end of the target MAC PDU.

With reference to the fifth possible implementation of the first aspect, in a ninth possible implementation, the obtaining at least one recovered RLC PDU includes: when the RLC PDU in the PDCP PDU is lost, determining receiving moments T1 and T2, where T1 is a receiving moment of a correctly received RLC PDU that is located before the lost RLC PDU in the PDCP PDU, and T2 is a receiving moment of a correctly received RLC PDU that is located after the lost RLC PDU in the PDCP PDU; determining, in the incorrectly received MAC PDUs, a target medium access control MAC PDU whose receiving moment is between T1 and T2, where a receiving moment of an RLC PDU is a receiving moment of a MAC PDU to which the RLC PDU belongs, and the receiving moment of the MAC PDU is a moment recorded when the MAC PDU is received, to be specific, a moment recorded when a receive end receives the MAC PDU; obtaining a speech payload from the target MAC PDU; and generating a recovered RLC PDU based on the speech payload, where the recovered RLC PDU is used to replace the lost RLC PDU. For example, one or more medium access control MAC PDUs and a cyclic redundancy check CRC that is used to check the MAC PDUs are obtained; receiving moments of the MAC PDUs are recorded; a target correspondence between a MAC PDU and a receiving moment is obtained, where the MAC PDU includes an RLC PDU; when the CRC check is correct, a first MAC PDU obtains a correctly received RLC PDU, where the first MAC PDU is a MAC PDU that is in the MAC PDUs and that is checked by using CRC corresponding to the correct check; when the CRC check is incorrect, a second MAC PDU is stored, where the second MAC PDU is a MAC PDU that is in the MAC PDUs and that is checked as incorrect by using CRC check; receiving moments T1 and T2 are determined based on the target correspondence, where T1 is a receiving moment of a correctly received RLC PDU that is located before the lost RLC PDU in the to-be-assembled PDCP PDU, and T2 is a receiving moment of a correctly received RLC PDU that is located after the lost RLC PDU in the to-be-assembled PDCP PDU; the target MAC PDU whose receiving moment is between T1 and T2 is selected from one or more second MAC PDUs based on the target correspondence; a speech payload is obtained from the target MAC PDU; and the recovered RLC PDU is generated based on the speech payload.

In this way, it may be implemented that the target MAC PDU corresponding to the lost RLC PDU is selected from a plurality of incorrectly received and obtained MAC PDUs. In other words, the reason for the loss of the RLC PDU is incorrect receiving of the target MAC PDU.

With reference to the first possible implementation of the first aspect, in a tenth possible implementation, data in the recovered RLC PDU is an all-zero sequence or a random bit sequence. In this way, data recovery may also be performed on the lost RLC PDU.

With reference to the first aspect, in an eleventh possible implementation, data in the N correctly received RLC PDUs includes a significant bit in the PDCP PDU. Because the correctly received RLC PDUs include the significant bit in the PDCP PDU, even if recovery that includes an error is performed on the lost RLC PDU, overall data of the PDCP PDU is not greatly affected. The significant bit may be a bit whose speech quality parameter is greater than a preset speech quality threshold, such as a bit that belongs to a subflow A.

With reference to the third possible implementation of the first aspect, in a twelfth possible implementation, the obtaining data in a data field includes: calculating a length of a speech payload of the lost RLC PDU based on a length of speech data of the N correctly received RLC PDUs and a preset speech frame length; and obtaining a random bit sequence whose length matches the length of the speech payload. In this way, it may be implemented that data in the recovered RLC PDU is the random bit sequence.

With reference to the third possible implementation of the first aspect, in a thirteenth possible implementation, the RLC header includes an RLCSN and FI, and the obtaining an RLC header includes: determining the RLCSN of the RLC header based on an RLCSN of a correctly received RLC PDU that is located before the lost RLC PDU and/or an RLCSN of a correctly received RLC PDU that is located after the lost RLC PDU. When the lost RLC PDU is located at an end location in the to-be-assembled PDCP PDU, it is determined that the FI of the RLC header is 10. When the lost RLC PDU is not located at the end location in the to-be-assembled PDCP PDU, it is determined that the FI of the RLC header is 11. In this way, it may be implemented that the RLC header is obtained.

With reference to the second possible implementation of the first aspect, in a fourteenth possible implementation, the determining whether an RLC PDU in the PDCP PDU is lost includes: determining a start RLC PDU and an end RLC PDU in the to-be-assembled PDCP PDU based on FI of an RLC PDU within an RLC packet range. The RLC packet range includes the correctly received RLC PDUs. Alternatively, the RLC packet range includes a start RLC PDU in a next PDCP PDU following the to-be-assembled PDCP PDU and the correctly received RLC PDUs.

Whether all RLC PDUs within a range from an RLCSN of the start RLC PDU to an RLCSN of the end RLC PDU are included in the RLC PDU packet range is determined. If not all the RLC PDUs within the range from the RLCSN of the start RLC PDU to the RLCSN of the end RLC PDU are included in the RLC PDU packet range, an RLC PDU in the to-be-assembled PDCP PDU is lost. Therefore, whether the RLC PDU in the PDCP PDU is lost may be determined by using the RLCSNs.

With reference to the first aspect, in a fifteenth possible implementation, the method of this implementation further includes:

obtaining a MAC PDU corresponding to a non-significant bit in the PDCP PDU; and if a quantity of retransmission times of the MAC PDU corresponding to the non-significant bit reaches a quantity of times of retransmission occurring until retransmission is terminated, sending an ACK message to a transmit end, where the quantity of times of retransmission occurring until retransmission is terminated is less than a maximum quantity of retransmission times of the MAC PDU. The MAC PDU corresponding to the non-significant bit may be a MAC PDU whose speech data belongs to a subflow B bit. The maximum quantity of retransmission times of the MAC PDU may be a value set by a system. After sending the ACK message, a receive end that obtains the MAC PDU can stop a transmit end from retransmitting the MAC PDU corresponding to the non-significant bit, so that the retransmission of the MAC PDU is terminated in advance, and there is no need to terminate the retransmission of the MAC PDU until the maximum quantity of retransmission times is reached. Therefore, an increase of a transmission latency at a higher layer is avoided and a packet loss rate at the higher layer is reduced. Further, retransmission of the MAC PDU corresponding to the non-significant bit is terminated in advance. Therefore, even if a bit of this type includes an error, subjective experience of the user is less affected.

According to a second aspect, an embodiment of this application provides a data processing device, where the data processing device has a function of the data processing device in the foregoing method. The function may be implemented by hardware, or may be implemented by hardware by executing corresponding software. The hardware or software includes one or more modules corresponding to the function.

In a possible implementation, the data processing device includes:

an obtaining unit, configured to obtain N correctly received radio link control RLC PDUs in a packet data convergence protocol PDCP protocol data unit PDU; and a generation unit, configured to generate the PDCP PDU based on the N correctly received RLC PDUs, where the PDCP PDU includes M RLC PDUs, N and M are positive integers, and N<M.

In another possible implementation, the data processing device includes:

a transceiver and a processor, where the transceiver performs the following action: obtaining N correctly received radio link control RLC PDUs in a packet data convergence protocol PDCP protocol data unit PDU; and the processor performs the following action: generating the PDCP PDU based on the N correctly received RLC PDUs, where the PDCP PDU includes M RLC PDUs, N and M are positive integers, and N<M.

According to another aspect of this application, a computer readable storage medium is provided. The computer readable storage medium stores an instruction. When the instruction runs on a computer, the computer performs the method according to the foregoing aspects.

According to another aspect of this application, a computer program product including an instruction is provided. When the computer program product runs on a computer, the computer performs the method according to the foregoing aspects.

In the technical solutions provided in the embodiments of the present invention, a device obtains the N correctly received RLC PDUs in the PDCP PDU, and then generates the PDCP PDU based on the N correctly received RLC PDUs, where the PDCP PDU includes the M RLC PDUs, N and M are positive integers, and N<M. In this way, the PDCP PDU can be generated based on some correctly received RLC PDUs in the PDCP PDU, and there is no need to assemble all the RLC PDUs to obtain the PDCP PDU. Therefore, even if an RLC PDU that does not need to be used is incorrectly received or lost, generation of the PDCP PDU is not affected.

DESCRIPTION OF DRAWINGS

FIG. 10b is a partial schematic structural diagram of a data processing device shown in FIG. 10a.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1A:
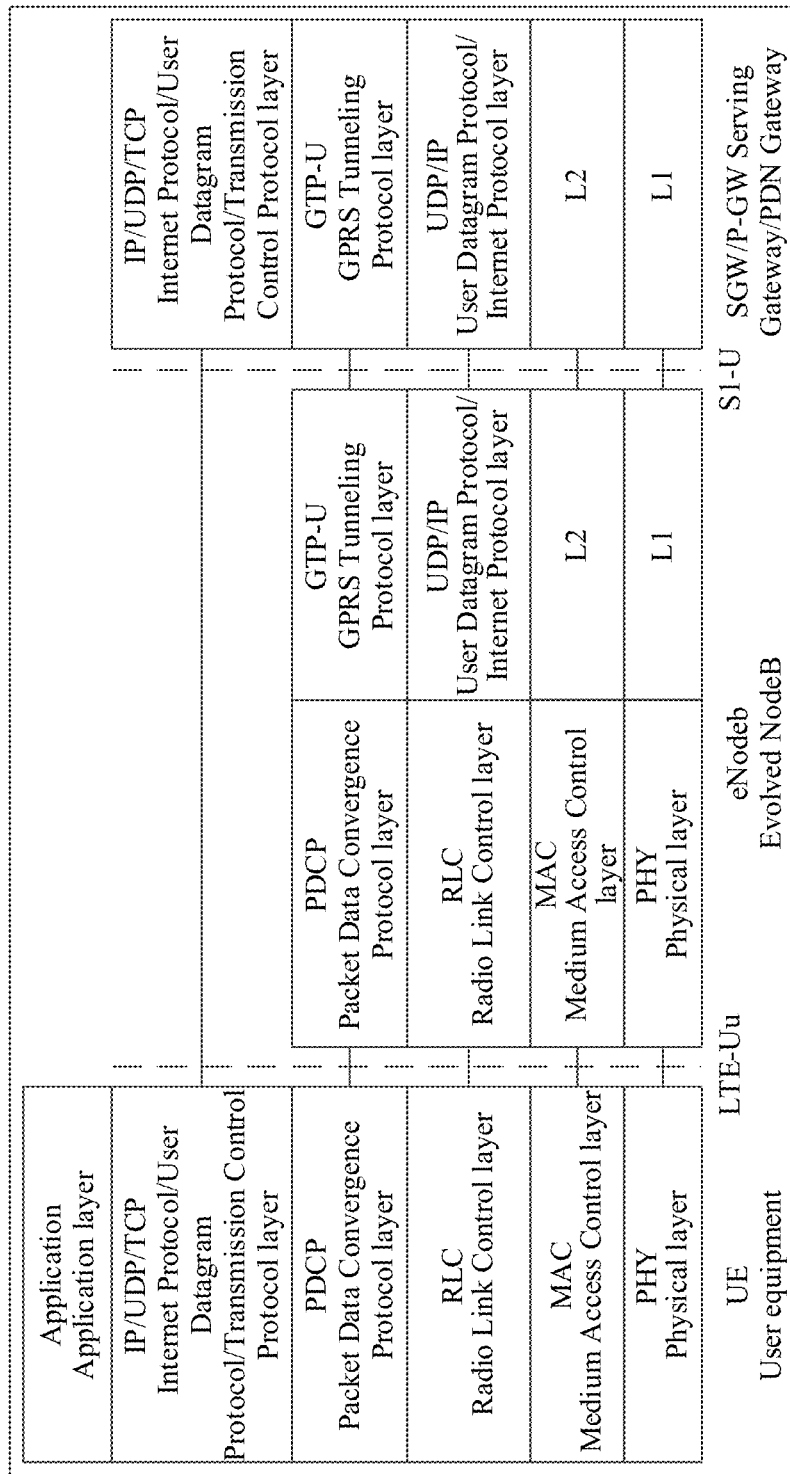
FIG. 1a is a block diagram of an existing LTE user plane protocol.

FIG. 1a is a block diagram of a user plane protocol in LTE (long term evolution), and shows protocol layers related to a user plane in an LTE transmission process. Functions of an RLC layer are described below.

The functions of RLC in LTE may be classified as follows: segmentation or resegmentation, concatenation, reordering, and reassembly.

Segmentation is performed at only a transmit end of a UM/AM entity. As shown in FIG. 1c, when a size of an RLC (radio link control) PDU (protocol data unit), that is indicated by a MAC (medium access control) layer is smaller than a size of an RLC SDU (service data unit), an RLC entity performs a segmentation operation on the RLC SDU, so that a size of a generated RLC PDU can match a size of an RLC SDU segment. Resegmentation is performed at only the transmit end of the AM entity. An RLC AM entity supports ARQ retransmission. When a size of a retransmitted RLC PDU cannot match a total size of RLC PDUs that is indicated by the MAC layer, the RLC layer performs a segmentation operation on the retransmitted RLC PDU based on the situation, so that a size of a generated RLC PDU segment can match the total size of the RLC PDUs that is indicated by the MAC layer. Concatenation is performed at only the transmit end of the UM/AM entity. When the total size of the RLC PDUs that is indicated by the MAC layer is greater than the size of the RLC SDU, the RLC layer performs a concatenation operation on RLC SDUs based on the situation, so that one RLC SDU is concatenated with another RLC SDU or a segment of another RLC SDU. In this case, a size of a generated RLC PDU can match the concatenated RLC SDUs. Segmentation, resegmentation, and concatenation are completed at the transmit end (a UE (user equipment) side in FIG. 1a), and corresponding reordering and reassembly functions are implemented at a receive end (an eNodeB (evolved NodeB) side in FIG. 1a).

Reordering: RLC SDUs sent by the transmit end based on RLCSN numbers arrive at a receiving side in disorder due to HARQ (hybrid automatic retransmission request) retransmission. In this case, the eNodeB checks the RLCSN numbers, any repeatedly received RLC SDU is discarded first, and remaining RLC SDUs are sorted based on RLCSN numbers.

Reordered RLC SDUs are reassembled based on information about an SN bit and an FI bit in an RLC header, to obtain a complete PDCP SDU, and the complete PDCP SDU is sent to an upper layer. However, if at least one RLC PDU segment is lost, all other RLC PDU segments in an entire PDCP that are related to the lost RLC PDU segment are discarded.

For an intuitive explanation, an AMR (adaptive multi-rate) scenario is first described.

In a conventional communications system, most used speech coding systems are based on narrowband speech, and a frequency band is generally limited within 200 Hz to 3400 Hz. The inherent bandwidth limitation has limited further improvement of speech quality since humans implemented telephone communication. To implement high-quality voice communication, the bandwidth limitation needs to be broken. In addition, increasingly breakthroughs achieved in digital communications network technologies, for example, emergence of the 3rd generation mobile communication, provide wider space for application of wideband speech coding. AMR-WB (adaptive multi-rate wideband) speech coding, namely, adaptive multi-rate wideband speech coding, is a wideband speech coding manner originally designed for the GSM (global system for mobile communication) and the 3rd generation mobile communications system WCDMA (wideband code division multiple access), and then is adopted by the ITU (international telecommunication union) as a new standard of high-quality digital wideband speech coding. Currently, the AMR-WB speech is widely used in VoLTE (Voice over LTE). Therefore, in the history of communication, the AMR-WB speech coding is a first speech coding system that can be used for both a wired service and a wireless service. Different from a previous speech coding manner in which a bit rate is fixed, a bit rate of the AMR-WB is not fixed, but varies with different transmission environments. That is why the AMR-WB speech coding is adaptive. In the AMR-WB, a speech bandwidth is 500 to 7000 Hz and a sampling rate is 16 kHz. Compared with a conventional bandwidth of 200 to 3400 Hz, an extended part of 50 to 200 Hz makes voices heard more natural and comfortable, and an extended part of 3400 to 7000 Hz in a high frequency band improve discrimination of a fricative. In this way, speech intelligibility is improved. Therefore, the AMR-WB is a high-quality digital wideband speech coding system.

Bits output by an AMR speech encoder are reordered based on subjective significance of the bits. The subjective significance means impact of an error (bit flipping or deletion) that occurs during bit transmission on speech quality. Because subjective experience of a human may vary greatly or slightly based on a bit location, significance of bits at different locations is different for subjective experience of speech quality.

To better distinguish between differences in subjective experience that are caused by different bit locations, the AMR encoder divides bits generated through encoding into three parts, where the three parts are referred to as a subflow A, a subflow B, and a subflow C. In all the encoded bits, a bit included in the subflow A is a bit most sensitive to an error. When an error occurs in an encoded bit of such a type, a speech frame is severely damaged. In this case, not only subjective experience of speech is greatly declined, but also a problem that decoding cannot be correctly performed on a receiving side may be caused. Therefore, in the protocol (3GPP TS 26.201), additional CRC is performed to check the subflow A. When errors occur in speech bits in the subflow B and the subflow C, subjective experience of the speech is decreased in descending order based on an order of the bits. Unlike the subflow A, when the subflow B and the subflow C include errors, a decoder on the receiving side can normally complete decoding. Sensitivities of the subflow A, the subflow B, and the subflow C to an error bit are sorted as follows:

subflow A>subflow B>subflow C.

In addition, significance of bits in each of the subflow A, the subflow B, and the subflow C is decreased in sequence. In the protocol 3GPP TS 26.201, division of the subflow A, the subflow B, and the subflow C at each rate is listed, and the AMR-WB is used as an example, as shown in Table 1:

TABLE 1

| Frame Type | AMR-WB codec mode | Total number of bits | Class A | Class B | Class C |
| --- | --- | --- | --- | --- | --- |
| 0 | 6.6 | 132 | 54 | 78 | 0 |
| 1 | 8.85 | 177 | 64 | 113 | 0 |
| 2 | 12.65 | 253 | 72 | 181 | 0 |
| 3 | 14.25 | 285 | 72 | 213 | 0 |
| 4 | 15.85 | 317 | 72 | 245 | 0 |
| 5 | 18.25 | 365 | 72 | 293 | 0 |
| 6 | 19.85 | 397 | 72 | 325 | 0 |
| 7 | 23.05 | 461 | 72 | 389 | 0 |
| 8 | 23.85 | 477 | 72 | 405 | 0 |

Figure 1B:
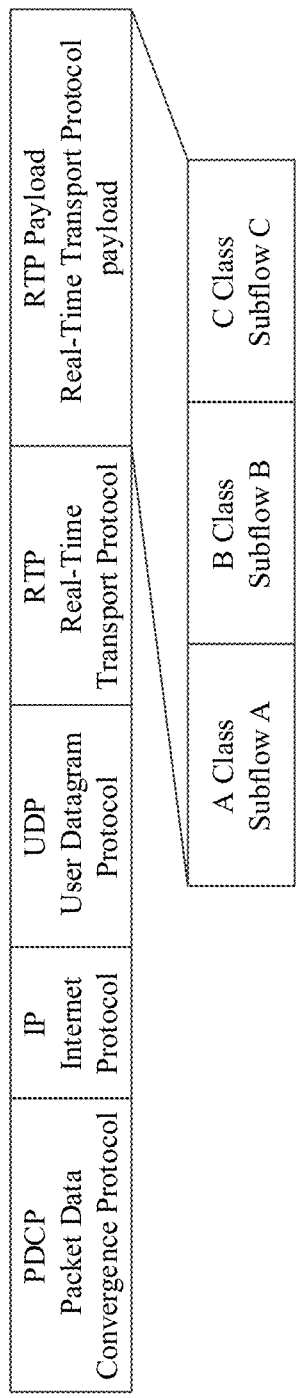
FIG. 1b is a schematic diagram of a packet format of an existing speech frame in VoLTE.
Figure 1C:
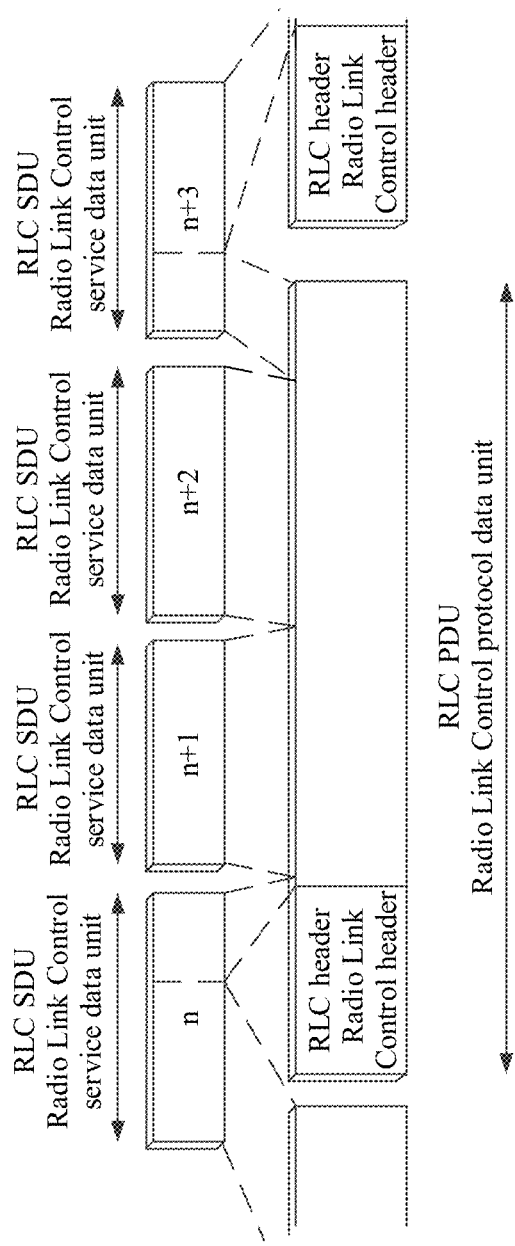
FIG. 1c is a schematic diagram of segmentation and concatenation of an existing RLC SDU.

In VoLTE, a detailed format of speech transmission is shown in FIG. 1b.

FIG. 1b shows a typical packet format of a speech frame in VoLTE. An RTP payload in an upper part of FIG. 1b represents speech frame data. A specific structure of the RTP payload is shown in a lower part of FIG. 1b, and includes three subflows: A, B, and C. A specific value of a length of each subflow meets a requirement in the 3GPP TS 26.201. The AMR-WB is used as an example. As shown in Table 1, a length of the subflow C is 0, so that a speech frame includes only the subflow A and the subflow B.

It is determined based on RLC segmentation and a reassembly mechanism that when at least one of segments belongs to a same PDCP (packet data convergence protocol) SDU is lost, all RLC segments related to the PDCP PDU are discarded. In a VoLTE scenario, as shown in FIG. 1a, it is assumed that an entire PDCP PDU is divided into [0, . . . , n−1] RLC SDUs. In this case, if an $(n-1)^{th}$ RLC SDU is lost during transmission, all n RLC SDUs are discarded based on an RLC layer processing mechanism, where n is a positive integer.

It can be learned from the AMR encoding manner that, in this case, the $(n-1)^{th}$ RLC SDU is in the subflow B or the subflow C of the speech frame. Impact of encoded bits in the subflow B or the subflow C on subjective experience of the speech is smaller than that of the subflow A.

Compared with a solution in which an incorrect RLC SDU is reserved and a PDCP that includes an error is assembled and is submitted to a PDCP layer, a solution in which all related RLC SDUs are lost and eventually a PDCP speech packet is lost causes a greater loss in subjective experience. For example, an example in which a speech rate in the AMR-WB is 23.85 k is used, a total length of a speech frame is 476 bits, and currently, an average TB size of RLC SDUs is 100 bits. In this scenario, when an error occurs in the 100 bits, discarding the entire 476 bits causes a poorer subjective experience of speech than reserving the 476 bits.

It may be understood that the foregoing scenario is described by using AMR as an example, and is also applicable to a field such as video frame transmission.

Therefore, to avoid a problem of a relatively large data loss that is caused by discarding all RLC PDUs in a PDCP PDU when an RLC PDU in the PDCP PDU is lost, an embodiment of the present invention provides a data processing method, to recover a lost RLC PDU, so as to prevent all RLC PDUs in a corresponding PDCP from discarding, thereby reducing a frame data loss and improving subjective experience of a user.

Figure 2:
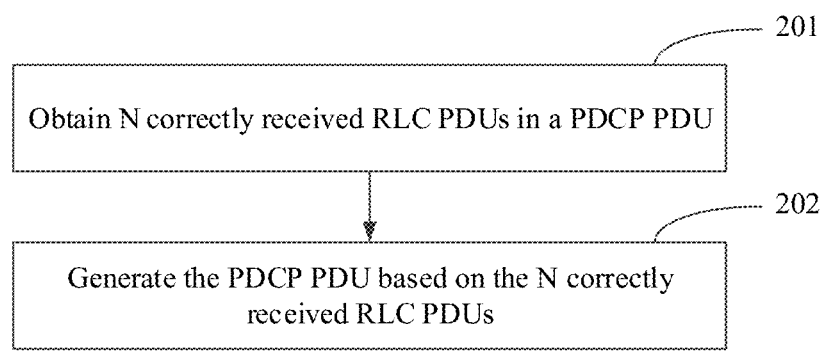
FIG. 2 is a method flowchart of a data processing method according to an embodiment of the present invention.

FIG. 2 is a method flowchart of a data processing method according to an embodiment of the present invention. The method included the following steps.

Step 201: Obtain N correctly received RLC PDUs in a PDCP PDU.

A data processing device needs to obtain some correctly received RLC PDUs in the PDCP PDU before generating the PDCP PDU.

The correctly received RLC PDU is an RLC PDU that belongs to a MAC PDU on which a CRC (cyclic redundancy check) check is correct, to be specific, an RLC PDU extracted from the MAC PDU on which the CRC check is correct. The MAC PDU is a correctly transmitted/received MAC PDU.

In this embodiment of the present invention, the data processing device may be a device such as a base station or UE. This is not specifically limited in this embodiment of the present invention.

Step 202: Generate the PDCP PDU based on the N correctly received RLC PDUs.

The PDCP PDU includes M RLC PDUs, N and M are positive integers, and N<M.

Even if the PDCP includes data that includes an error, the PDCP may be reserved, or even if the PDCP PDU is not completely obtained, the PDCP may be generated based on at least one correctly received and obtained RLC PDU, provided that the data processing device obtains only one correctly received RLC PDU, which indicates that the data processing device obtains valid data of the PDCP to which the RLC PDU belongs. Alternatively, the data processing device may obtain the PDCP based on some RLC PDUs in the correctly received and obtained RLC PDUs.

Step 202 in this embodiment of the present invention may be implemented in a plurality of manners. For example, after some correctly received RLC PDUs are obtained, the PDCP may be generated by using these correctly received RLC PDUs.

In some embodiments of the present invention, the generating the PDCP PDU based on the N correctly received RLC PDUs includes: obtaining at least one recovered RLC PDU, and generating the PDCP PDU based on the N correctly received RLC PDUs and the recovered RLC PDU.

When a data recovery device obtains the some correctly received RLC PDUs in the PDCP PDU, to generate the PDCP PDU, the data recovery device needs to obtain a quantity of the RLC PDUs required by the PDCP, which includes the correctly received RLC PDUs and a preset quantity of recovered RLC PDUs. The recovered RLC PDUs and the correctly received RLC PDUs may be used as all the RLC PDUs included in the PDCP PDU. Therefore, the PDCP PDU may be generated based on the N correctly received RLC PDUs and the recovered RLC PDUs.

There are a plurality of sources or types of data in a data field of the recovered RLC PDU. For example, the data in the recovered RLC PDU is a speech payload obtained from an incorrectly received MAC PDU, or the data in the recovered RLC PDU is an all-zero sequence or a random bit sequence.

In some embodiments of the present invention, data in the N correctly received RLC PDUs includes a significant bit in the PDCP PDU. Therefore, the PDCP PDU can be generated provided that the significant bit is obtained. A remaining non-significant bit may be filled in another manner, for example, by using a preset bit sequence, or obtained from the incorrectly received MAC PDU.

In some embodiments of the present invention, an RLC PDU in the to-be-assembled PDCP PDU in this embodiment of the present invention is lost, and after some correctly received RLC PDUs are obtained, an obtained recovered RLC PDU is used to recover the lost RLC PDU. In this case, a process of performing the data processing method in this embodiment of the present invention is described below.

Figure 3A:
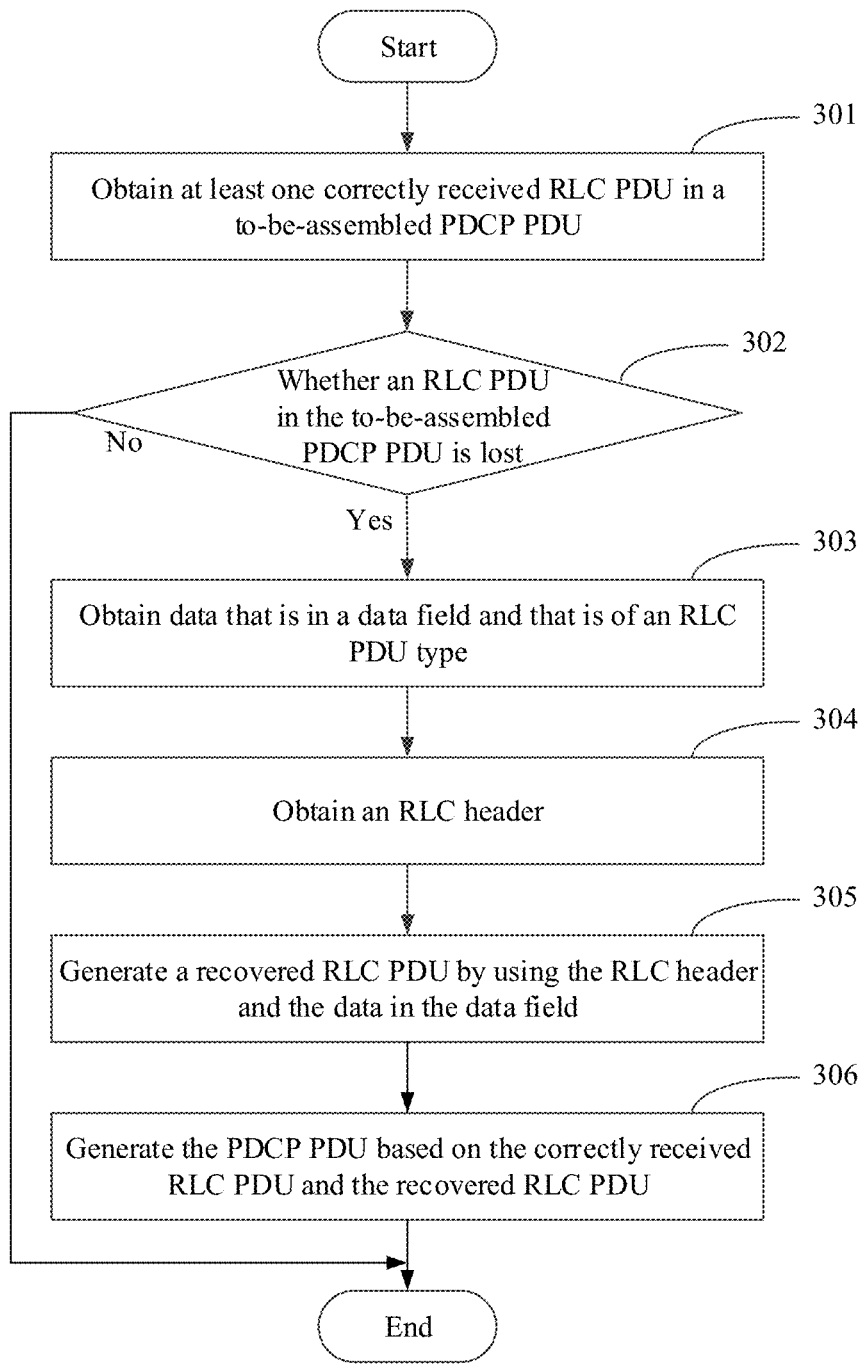
FIG. 3a is a method flowchart of a data processing method according to an embodiment of the present invention.

FIG. 3a is a method flowchart of a data processing method according to an embodiment of the present invention. Referring to FIG. 3a, the data processing method in this embodiment of the present invention includes the following steps.

Step 301: Obtain at least one correctly received RLC PDU in a to-be-assembled PDCP PDU.

The correctly received RLC PDU is an RLC PDU that belongs to a MAC PDU on which a CRC check is correct, namely, an RLC PDU extracted from the MAC PDU on which the CRC (cyclic redundancy check) check is correct. The MAC PDU is a correctly transmitted/received MAC PDU.

Step 302: Determine whether an RLC PDU in the to-be-assembled PDCP PDU is lost, and if the RLC PDU in the to-be-assembled PDCP PDU is lost, perform step 303.

After a data recovery device obtains the at least one correctly received RLC PDU in the to-be-assembled PDCP PDU, the data recovery device determines whether an RLC PDU in the to-be-assembled PDCP PDU is lost. If the RLC PDU in the to-be-assembled PDCP PDU is lost, the data recovery device attempts to recover the lost RLC PDU. For a specific recovery method, refer to detailed descriptions in step 303 to step 305. If no RLC PDU in the to-be-assembled PDCP PDU is lost, the PDCP PDU is obtained by assembling these correctly received RLC PDUs.

There are a plurality of specific determining methods. This is not specifically limited in this embodiment of the present invention. The following examples are provided.

(1) After an RLCSN of a start RLC PDU and an RLCSN of an end RLC PDU in the to-be-assembled PDCP PDU are determined, when not all RLC PDUs within a range from the RLCSN of the start RLC PDU to the RLCSN of the end RLC PDU are included at an RLC layer of the data recovery device, an RLC PDU that is not included in the range is the lost RLC PDU, in other words, it indicates that the RLC PDU in the to-be-assembled PDCP PDU is lost. Otherwise, no RLC PDU in the PDCP PDU is lost.

(2) After obtaining some RLC PDUs in the PDCP packet, the data recovery device stops obtaining a remaining RLC PDU. In this case, it is determined that the RLC PDU in the PDCP PDU is lost. The reason for stopping may be that the device actively stops obtaining, or the device stops obtaining due to a fault.

It may be understood that there are one or more lost RLC PDUs, and this is not specifically limited in this embodiment of the present invention. Further, a type of the lost RLC PDU is not specifically limited in this embodiment of the present invention.

In some embodiments of the present invention, step 302 is specifically performed to determine whether a preset RLC PDU in the to-be-assembled PDCP PDU is lost. The preset RLC PDU is an RLC PDU whose speech quality parameter of speech data is less than a preset quality threshold. Alternatively, the preset RLC PDU is an RLC PDU whose speech data of data in a data field belongs to a subflow A bit. In other words, the data recovery device recovers the lost RLC PDU only when a specific RLC PDU is lost. Otherwise, the data recovery device does not recover the lost RLC PDU. In this way, when an RLC PDU that is inconveniently recovered is lost, the data recovery device stops recovering the lost RLC PDU, and directly discards the to-be-assembled PDCP PDU packet. In this way, selective recovery for the lost RLC PDU in the PDCP PDU is implemented, and flexibility of the method in this embodiment of the present invention is improved, thereby improving execution efficiency.

Step 303: Obtain data that is in a data field and that is of an RLC PDU type.

When the RLC PDU in the to-be-assembled PDCP PDU is lost, the data in the data field of the RLC PDU is obtained, and the data in the data field is used to recover data in a data field of the lost RLC PDU.

There are a plurality of specific methods for obtaining the data in the data field of the RLC PDU. This is not specifically limited in this embodiment of the present invention. The following examples are provided.

(1). A random bit sequence is used as the data in the data field of the RLC PDU. In this case, a length of the random bit sequence needs to match a length of the data field of the lost RLC PDU.

(2). A preset bit sequence is used as the data in the data field of the RLC PDU. In this case, a length of the preset bit sequence needs to match the length of the data field of the lost RLC PDU. The preset bit sequence may be an all-zero sequence, or a bit sequence that is obtained through statistical analysis and that has a beneficial recovery effect on data such as speech or a video.

(3). A data payload extracted from an incorrectly received MAC PDU is used as the data in the data field of the RLC PDU. The incorrectly received MAC PDU is a MAC PDU on which a CRC check is incorrect, and is discarded by the device. Therefore, the device loses an RLC PDU included in the incorrectly received MAC PDU. However, in the method in this embodiment of the present invention, the incorrectly received MAC PDU is buffered in a preset buffer area. After it is determined that the RLC PDU is lost, the MAC PDU to which the lost RLC PDU belongs is obtained from the buffer area, and the data payload such as a speech payload is extracted from the MAC PDU. Even if the data payload is incorrect, the data payload may still be used to assemble a PDCP PDU that includes an error. Therefore, the PDCP PDU is reserved in the device.

Step 304: Obtain an RLC header.

When the RLC PDU in the to-be-assembled PDCP PDU is lost, the RLC header further needs to be obtained, and the RLC header is used as an RLC header for recovering the RLC PDU. The RLC header includes an RLCSN and FI.

The RLCSN is an RLC sequence number. When a long sequence number of 10 bits is used, values of RLCSNs are cyclic values from 0 to 1023 (including 0 and 1023). The FI is a 2-bit flag bit in which an RLC segmentation status is recorded.

There are a plurality of specific methods for obtaining the RLC header. The following examples are provided.

(1) After RLCSNs of all RLC PDUs in the to-be-assembled PDCP PDU are obtained, an RLCSN of the lost RLC PDU may be determined. To be specific, in all the RLCSNs in the to-be-assembled PDCP PDU, if an RLCSN is not corresponding to any correctly received RLC PDU, the RLCSN is the RLCSN of the lost RLC PDU. Alternatively, the RLCSN of the lost RLC PDU may be determined based on RLCSNs of correctly received RLC PDUs followed by and following the lost RLC PDU. This is particularly applicable to a case in which a plurality of RLC PDUs are lost. Then, FI of the RLC PDU is determined based on a location of the lost RLC PDU in the PDCP PDU. When the lost RLC PDU is located at an end location in the to-be-assembled PDCP PDU, it is determined that the FI of the RLC header is 10. Otherwise, it is determined that the FI is 11.

(2). After the incorrectly received MAC PDU corresponding to the lost RLC PDU is obtained, the RLC header is extracted from the MAC PDU, and the RLC header is directly used as the RLC header of the lost RLC PDU.

Step 305: Generate a recovered RLC PDU by using the RLC header and the data in the data field.

After obtaining the RLC header and the data in the data field, the data recovery device may generate the recovered RLC PDU based on the RLC header and the data in the data field. The recovered RLC PDU includes the RLC header and the data in the data field. The recovered RLC PDU is used to recover the lost RLC PDU in the to-be-assembled PDCP PDU, in other words, to replace the lost RLC PDU. Therefore, the to-be-assembled PDCP PDU includes all the RLC PDUs.

In this way, the recovered RLC PDU may be obtained by performing only step 303 to step 305.

Step 306: Generate the PDCP PDU based on the correctly received RLC PDU and the recovered RLC PDU.

The data recovery device obtains the correctly received RLC PDU, and recovers the lost RLC PDU by using the generated recovered RLC PDU and the foregoing recovery method. In this way, the data recovery device includes all the RLC PDUs in the to-be-assembled PDCP PDU, so that the PDCP PDU can be obtained by assembling these RLC PDUs.

Figure 3B:
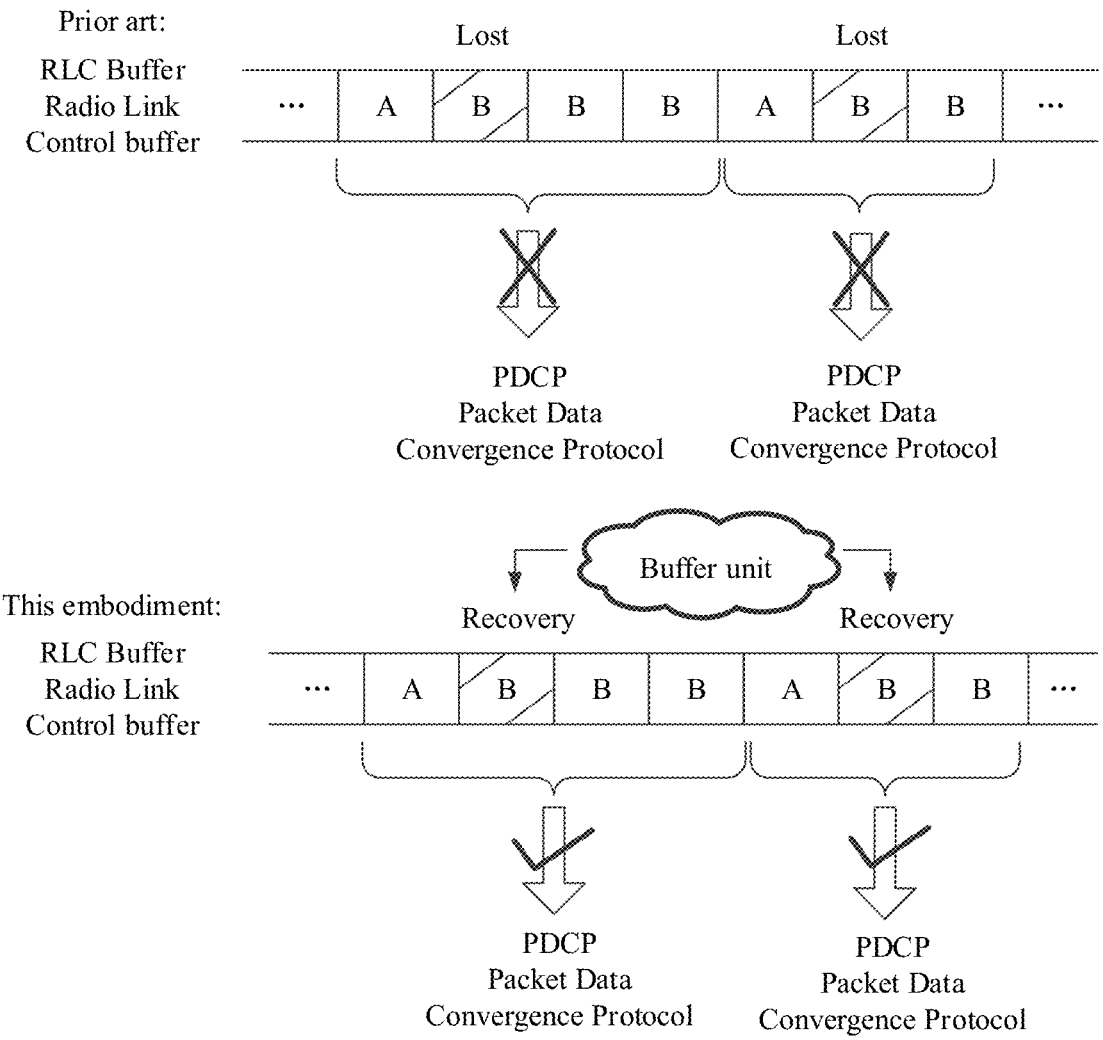
FIG. 3b is a diagram of comparison between the prior art and a data processing method in an embodiment of the present invention according to an embodiment of the present invention.

For example, FIG. 3b is a diagram of comparison between the prior art and a specific implementation of the data processing method according to an embodiment of the present invention. In the prior art, if an RLC PDU that belongs to a subflow B segment is lost, generation of the PDCP PDU fails. However, in this embodiment of the present invention, by recovering the lost RLC PDU, a PDCP PDU may be generated based on a correctly received RLC PDU and the RLC PDU obtained through recovery.

In conclusion, according to the technical solution provided in this embodiment of the present invention, the at least one correctly received RLC PDU in the to-be-assembled PDCP PDU is obtained. The correctly received RLC PDU is the RLC PDU that belongs to the MAC PDU on which the CRC check is correct. Then, it is determined whether the RLC PDU in the to-be-assembled PDCP PDU is lost. If the RLC PDU in the to-be-assembled PDCP PDU is lost, the data in the data field of the RLC PDU needs to be obtained, and the RLC header needs to be obtained. Then, after the recovered RLC PDU is generated by using the RLC header and the data in the data field, the PDCP PDU is generated based on the correctly received RLC PDU and the recovered RLC PDU. In this way, when the RLC PDU in the PDCP PDU is lost, the recovered RLC PDU is generated to recover the lost RLC PDU, and the PDCP PDU can be obtained by assembling the recovered RLC PDU and the correctly received RLC PDU. Therefore, the PDCP PDU in which the RLC PDU is lost is prevented from being discarded, and the PDCP PDU is reserved, thereby reducing a data loss and improving integrity of frame data. When a user uses data related to the PDCP PDU, subjective experience of the user can be improved. In other words, a specific BER is allowed when a packet is being assembled at the RLC layer, so as to prevent an entire PDCP packet from being discarded. Therefore, more valid speech bits are reserved, thereby improving subjective experience of speech.

To more intuitively describe the data processing method in this embodiment of the present invention, the following uses an example in which the method in this embodiment of the present invention is performed on a base station side in the VoLTE scenario and the AMR-WB scenario for description. It may be understood that in addition to the AMR-WB scenario, the method in this embodiment of the present invention may be applied to another scenario, such as a video transmission scenario. The following speech payload may also be another type of data.

Figure 4:
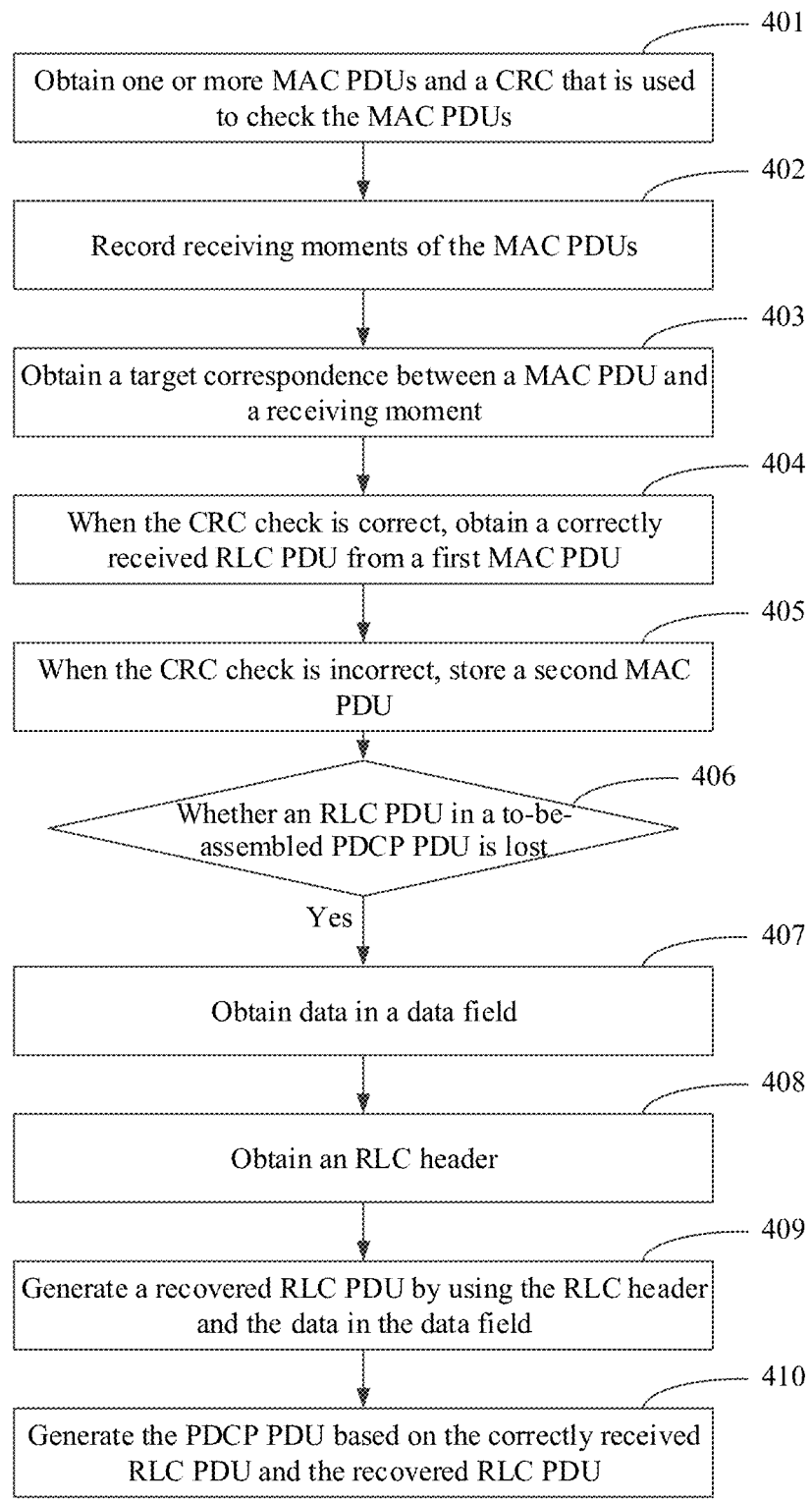
FIG. 4 is a method flowchart of a data processing method according to an embodiment of the present invention.

FIG. 4 is a method flowchart of a data processing method according to an embodiment of the present invention. Referring to FIG. 4, the data processing method in this embodiment of the present invention includes the following steps.

Step 401: Obtain one or more MAC PDUs and a CRC that is used to check the MAC PDUs.

The base station obtains the MAC PDUs and the CRC that is used to check the MAC PDUs. A check is performed by using the CRC. If the CRC check is correct, a MAC PDU is correctly transmitted, in other words, the base station receives the correct MAC PDU. If the CRC check is incorrect, a MAC PDU is incorrectly received.

For example, a physical layer of the base station obtains a transport block TB and CRC through a HARQ process, where the transport block carries a MAC PDU, and the CRC is used to check the MAC PDU. The MAC PDU is a transport block TB before Turbo code encoding. After being encoded and modulated, the MAC PDU and the CRC are finally carried on a physical channel for sending.

Step 402: Record receiving moments of the MAC PDUs.

When obtaining a TB (transport block) that carries a MAC PDU, the base station records a receiving moment. The receiving moment is used to record a moment at which the base station obtains the MAC PDU. In a HARQ process scenario, the receiving moment is an initial transmission receiving moment. The initial transmission receiving moment is used to record a moment at which the base station initially obtains the MAC PDU. If the CRC check corresponding to the MAC PDU is incorrect, in other words, the MAC PDU is incorrectly transmitted, the MAC PDU is retransmitted by using a retransmission mechanism of the base station, to obtain the correctly transmitted MAC PDU. There is no need to record a receiving moment of the retransmitted MAC PDU. To ensure a uniform description, a receiving moment in a specific scenario in this embodiment of the present invention is an initial transmission receiving moment T. In other words, T is a receiving moment of initially transmitted data in each HARQ process.

The initial transmission receiving moment T is corresponding to a MAC PDU, or corresponding to a TB.

Step 403: Obtain a target correspondence between a MAC PDU and a receiving moment.

After recording the receiving moment, the base station obtains the target correspondence between the MAC PDU and the initial transmission receiving moment. The target correspondence is a correspondence between the MAC PDU and the initial transmission receiving moment. Because the MAC PDU includes an RLC PDU, the target correspondence also includes a correspondence between the RLC PDU and the initial transmission receiving moment T.

Step 404: When the CRC check is correct, obtain a correctly received RLC PDU from a first MAC PDU.

The first MAC PDU is a MAC PDU that is in the MAC PDUs and that is checked as correct by using CRC check. The correctly received RLC PDU is an RLC PDU that belongs to a MAC PDU on which a CRC check is correct.

After the base station obtains CRC and a MAC PDU that are in a one-to-one correspondence, if the CRC check is correct, the corresponding MAC PDU is a correctly transmitted MAC PDU, namely, the first MAC PDU. An RLC PDU extracted from the correctly transmitted MAC PDU is a correctly transmitted RLC PDU, and the correctly transmitted RLC PDU is the correctly received RLC PDU.

Step 404 is a specific method for obtaining, by the base station, at least one correctly received RLC PDU in a to-be-assembled PDCP PDU. The base station obtains a correctly received RLC PDU in a to-be-assembled PDCP PDU, and there may be one or more correctly received RLC PDUs.

For example, after the base station obtains the TB that carries the MAC PDU and the CRC, when CRC=0, the physical layer of the base station transmits a data packet to a MAC layer based on a normal procedure, and transmits the initial transmission receiving moment T corresponding to the MAC PDU to the MAC layer. When the CRC check is correct, the MAC layer transmits, based on a normal processing procedure, the correctly transmitted MAC PDU and the initial transmission receiving moment T corresponding to the correctly transmitted MAC PDU to an RLC layer. The CRC is a cyclic redundancy check value of the transport block, "0" indicates correct transmission, and "1" indicates incorrect transmission.

Step 405: When the CRC check is incorrect, store a second MAC PDU.

The second MAC PDU is a MAC PDU that is in the MAC PDUs and that is checked incorrect by using CRC check. In other words, if the CRC check is incorrect, the MAC PDU checked by using the CRC is incorrectly transmitted, and the incorrectly transmitted MAC PCU is the second MAC PDU. An error that occurs during bit transmission, for example, bit flipping or deletion, may cause incorrect transmission of the MAC PDU. In the prior art, if the MAC PDU is incorrectly transmitted, the MAC PDU is discarded, and consequently, an RLC PDU carried by the incorrectly transmitted MAC PDU is discarded. However, in the method in this embodiment of the present invention, the incorrectly transmitted MAC PDU is buffered for subsequent use. Because the incorrectly transmitted MAC PDU is buffered, the RLC PDU is not extracted from the incorrectly transmitted MAC PDU. Therefore, when the PDCP PDU is being assembled, the RLC PDU in the MAC PDU is in a loss status.

For example, when the CRC check is incorrect and the MAC PDU checked by using the CRC is transmitted for a maximum quantity of times, the physical layer of the base station transmits a check result, a MAC PDU data packet, and an initial transmission receiving moment T corresponding to the MAC PDU data packet to the MAC layer. When the CRC check is incorrect, the MAC layer transmits the incorrectly transmitted MAC PDU and the initial transmission receiving moment T corresponding to the incorrectly transmitted MAC PDU to an ErrorBuffer (an error buffer unit) at the RLC layer. The ErrorBuffer is a buffer preset at the RLC layer to store a MAC PDU that is incorrectly transmitted at a last time.

Step 406: Determine whether a preset RLC PDU in a to-be-assembled PDCP PDU is lost, and if the preset RLC PDU in the to-be-assembled PDCP PDU is lost, perform step 407.

The preset RLC PDU is an RLC PDU that belongs to a non-subflow A segment, to be specific, an RLC PDU whose speech data of data in a data field of the RLC PDU belongs to a non-subflow A bit. For example, the preset RLC PDU is an RLC PDU that belongs to a subflow B segment or a subflow C segment.

For example, in a scenario in which an incorrectly received MAC PDU is buffered in the preset ErrorBuffer but a correctly received RLC PDU is stored in an RLC_Buffer (an RLC buffer unit), when RLC expiration packet assembly of QCI 1 is triggered, step 406 to step 410 are repeatedly performed until an RLC_Buffer update completes. In this way, to-be-assembled PDCP PDUs in which RLC PDUs are lost in the RLC_Buffer are recovered by using the lost RLC PDUs. In a scheme of recovering a lost RLC PDU based on an incorrectly received MAC PDU, an update process of the RLC_Buffer is a process in which the lost RLC PDU is recovered as much as possible by using the ErrorBuffer. Because of the retransmission mechanism, the MAC PDU may arrive out of order. A waiting mechanism is set for the RLC_Buffer. If an expected RLC PDU does not arrive, a packet assembly window may wait for a period of time, and expect the RLC PDU to arrive later. Only when the triggering expires, it may be determined that the expected RLC PDU is lost. In this way, packet recovery is not untimely performed on the PDCP PDU. A QCI is a QoS (Quality of Service) class identifier, and the QCI 1 represents a speech service.

An AMR-WB scenario is used as an example, step 406 may be implemented in the following manner.

First, the determining whether an RLC PDU in a to-be-assembled PDCP PDU is lost includes the following steps.

Step A1: Determine a start RLC PDU and an end RLC PDU in the to-be-assembled PDCP PDU based on FI of an RLC PDU within a pre-stored RLC packet range.

The RLC packet range includes a correctly received RLC PDU, or a start RLC PDU and a correctly received RLC PDU in a next PDCP PDU following the to-be-assembled PDCP PDU.

If correctly received RLC PDUs within the RLC packet range include the start RLC PDU and the end RLC PDU, the start RLC PDU in the next PDCP PDU may not be used. If the correctly received RLC PDUs within the RLC packet range include the start RLC PDU, but the end RLC PDU is a lost RLC PDU, the start RLC PDU in the next PDCP PDU following the to-be-assembled PDCP PDU is used to determine the end RLC PDU in the to-be-assembled PDCP PDU.

For the correctly received RLC PDU, a start RLC segment and an end RLC segment in a PDCP may be determined by parsing a flag bit FI in an RLC packet header. By determining the start RLC PDU and the end RLC PDU in the to-be-assembled PDCP PDU, it may be determined, on a PDCP PDU basis, whether each PDCP PDU of the base station needs to be recovered.

For example, there are two types of RLC segments separately used to concatenate PDCP PDUs and not used to concatenate PDCP PDUs. Whether an RLC segment is used for concatenation or not used for concatenation may be determined by parsing an RLC header. For the RLC used for concatenation, an FI field is usually "11", representing both an end of a current PDCP PDU and a start of a next PDCP PDU. For the RLC not used for concatenation, a flag bit FI of start RLC PDU in a PDCP PDU is "01" and a flag bit FI of end RLC PDU in the PDCP PDU is "10".

Step A2: Determine whether all RLC PDUs within a range from an RLCSN of the start RLC PDU to an RLCSN of the end RLC PDU are included in the RLC PDU packet range.

If not all the RLC PDUs within the range from the RLCSN of the start RLC PDU to the RLCSN of the end RLC PDU are included in the RLC PDU packet range, an RLC PDU in the to-be-assembled PDCP PDU is lost. RLCSNs within the range from the RLCSN of the start RLC PDU to the RLCSN of the end RLC PDU are RLCSNs of all the RLC PDUs in the to-be-assembled PDCP PDU. All the RLC PDUs include the correctly received RLC PDU, and also include a lost RLC PDU. Therefore, if an RLC PDU is not corresponding to any RLCSN, the RLC PDU is the lost RLC PDU.

Then, determining whether the lost RLC PDU belongs to the non-subflow A segment includes the following steps.

Step A3: If not all the RLC PDUs within the range from the RLCSN of the start RLC PDU to the RLCSN of the end RLC PDU are included in the RLC PDU packet range, determine whether a total length of speech data of correctly and continuously received RLC PDUs starting from the start RLC PDU is greater than a preset total length of a subflow A.

The total length of the subflow A is a length of speech data, of the to-be-assembled PDCP PDU, that belongs to a subflow A bit. As the format of the speech frame shown in FIG. 2, the subflow A bit is followed by a subflow B bit and a subflow C bit. If the total length of the speech data of the correctly and continuously received RLC PDUs starting from the start RLC PDU is greater than the total length of the subflow A, it indicates that subflow A bits of the PDCP PDU are correctly received. In other words, the speech data of the correctly received RLC PDUs includes all the subflow A bits. In this case, a speech data bit in the lost RLC PDU belongs to a non-A subflow. In an AMR-WB (wideband) scenario, as shown in Table 1, a length of a subflow C is 0, so that the speech frame includes only the subflow A and a subflow B, and the non-A subflow is the subflow B.

If the base station cannot obtain the start RLC PDU, or the total length of the speech data of the correctly and continuously received RLC PDUs starting from the start RLC PDU is less than the total length of the subflow A, the lost RLC PDU belongs to the subflow A. In the method in this embodiment of the present invention, a lost RLC PDU that belongs to the subflow A segment is not recovered. Because the speech frame is severely damaged when an error occurs in the subflow A bit, subjective experience of speech is greatly decreased, and decoding cannot be correctly performed on a receiving side. Therefore, to improve execution efficiency of the method in this embodiment of the present invention, an RLC PDU that belongs to the subflow A segment may not be recovered.

A manner of obtaining the preset total length of the subflow A may be as follows: Before step A3, by parsing a successfully assembled PDCP PDU, the base station can learn of a current encoding rate and ROHC switch information, so as to learn of the length of the subflow A. This is a preparation for the data processing method in this embodiment of the present invention.

Step A4: If the total length of the speech data of the correctly and continuously received RLC PDUs starting from the start RLC PDU is greater than the preset total length of the subflow A, perform the following step to obtain data in a data field of an RLC PDU.

As described above, if the total length of the speech data of the correctly and continuously received RLC PDUs starting from the start RLC PDU is greater than the preset total length of the subflow A, it indicates that the lost RLC PDU belongs to the subflow B segment. Then, the following method for recovering the lost RLC PDU is performed. In some embodiments of the present invention, if an RLC PDU that belongs to the subflow A segment and that is in the to-be-assembled PDCP PDU is lost, the data processing method in this embodiment of the present invention is abandoned.

It may be understood that, by using the foregoing method, the method in this embodiment of the present invention may be used to determine only whether the lost RLC PDU belongs to the subflow A segment or the subflow B segment. Alternatively, in some embodiments, the method may be used to determine the correctly received RLC PDU, to be specific, determine whether the correctly received RLC PDU belongs to the subflow A or the subflow B. In this way, it may be determined, based on whether the total length of the data of the correctly and continuously received RLC PDUs is greater than the total length of the subflow A, whether each received RLC PDU and each lost RLC PDU belong to the subflow A segment or the subflow B segment.

A bit in the subflow A is a significant bit in a speech PDCP PDU. For example, for a scenario in which an ROHC switch is on, the subflow A includes a higher layer header (including a PDCP header, a ROHC compression header, an RTP payload header of a BE or OA mode) and class A bits that are in a speech payload and that are specified in a protocol. For a scenario in which the ROHC switch is off, the subflow A includes only an unpredictable part in the higher layer header and the class A bits in the speech payload. A bit in the subflow B is a relatively non-significant bit in the speech PDCP PDU. For example, the subflow B includes class B bits that are in a speech payload and that are specified in the protocol.

In this way, a start RLC PDU and an end RLC PDU in a PDCP PDU may be obtained within the RLC packet range, and whether each RLC PDU is the subflow A segment or the subflow B segment is determined.

It may be understood that the foregoing method is described based on that the lost RLC PDU is the subflow B segment. In some embodiments of the present invention, the lost RLC PDU may not be determined, and the data processing method provided in this embodiment of the present invention may be performed when it is determined that the RLC PDU is lost. Alternatively, in some embodiments of the present invention, the data processing method provided in this embodiment of the present invention is performed only when it is determined that the preset RLC PDU in the to-be-assembled PDCP PDU is lost. The preset RLC PDU is an RLC PDU whose speech quality parameter of speech data in the RLC PDU is less than a preset quality threshold, in other words, the speech data of the preset RLC PDU is not significant in the to-be-assembled PDCP PDU. After the preset RLC PDU is lost, if an RLC PDU that includes an error is recovered for the lost preset RLC PDU, overall speech quality is not greatly affected and positive gains are obtained. However, if recovery is performed for the important RLC PDU, the RLC PDU that includes an error may bring a great impact to subjective experience of a user, so that recovery for the lost RLC PDU is of little significance. In this case, directly discarding the to-be-assembled PDCP PDU can improve execution efficiency. An RLC PDU that belongs to the non-A subflow is a specific example of the RLC PDU whose speech quality parameter of the speech data is less than the preset quality threshold.

Step 407: Obtain data in a data field.

The data in the data field is data that is in a data field and that is of an RLC PDU type. When the preset RLC PDU in the to-be-assembled PDCP PDU is lost, the speech data of the RLC PDU is obtained to recover data in a data field of the lost RLC PDU. In this embodiment of the present invention, an example in which the data in the data field of the RLC PDU is speech data is used for description.

There are a plurality of specific methods for obtaining the data in the data field of the RLC PDU, and several examples are given below.

1. The Data in the Data Field is Obtained Based on the Incorrectly Received MAC PDU.

Step B1: Obtain a target MAC PDU.

The target MAC PDU, namely, the second MAC PDU in step 405, is a MAC PDU checked as incorrect by using CRC check, and an RLC PDU included in the target MAC PDU is the lost RLC PDU in the to-be-assembled PDCP PDU. However, an RLC PDU carried in the second MAC PDU is the lost RLC PDU in the to-be-assembled PDCP PDU.

Optionally, a specific implementation of obtaining the target MAC PDU is that: determining receiving moments T1 and T2 based on a target correspondence. T1 is an initial receiving moment of a correctly received RLC PDU that is located before the lost RLC PDU in the to-be-assembled PDCP PDU, and T2 is an initial receiving moment of a correctly received RLC PDU that is located after the lost RLC PDU in the to-be-assembled PDCP PDU. Then, the target MAC PDU whose receiving moment is between T1 and T2 is selected from one or more second MAC PDUs based on the target correspondence. In other words, the target MAC PDU is selected from the stored second MAC PDUs based on a correspondence between the initial receiving moment obtained in the foregoing step and the MAC PDU.

For example, based on the initial transmission receiving moments T1 and T2 of the correctly received RLC PDUs that are respectively located before and after the lost RLC PDU, the MAC PDU whose initial transmission receiving moment is between T1 and T2 is selected from the Error-Buffer. If the corresponding MAC PDU is obtained, the segment is recovered. The ErrorBuffer is the buffer preset at the RLC layer to store the MAC PDU that is incorrectly transmitted at a last time.

In some embodiments of the present invention, if more than one MAC PDU whose initial transmission receiving moment is between T1 and T2 is selected from the Error-Buffer, recovery for the lost RLC PDU is abandoned. In this case, the more than one MAC PDU may include an RTCP packet (an RTP control packet) and another non-speech bearer packet. Recovery is abandoned, so that content of the non-speech packet is not considered as a speech packet. Certainly, in some embodiments, after a plurality of MAC PDUs whose initial transmission receiving moment is between T1 and T2 are obtained, one MAC PDU may be selected from the plurality of MAC PDUs to perform the method in this embodiment of the present invention.

Step B2: Obtain a speech payload from the target MAC PDU.

After the target MAC PDU is obtained, the data in the data field of the RLC PDU may be obtained based on the target MAC PDU. Because the RLC PDU in the target MAC PDU is the lost RLC PDU, a BER of an RLC PDU obtained through recovery is relatively small, and speech quality is least affected after decoding. In this way, it may be implemented that data in the recovered RLC PDU is a speech payload obtained from an incorrectly received MAC PDU.

In some embodiments of the present invention, if the lost RLC PDU is the subflow B segment and more than two RLC PDUs are lost, the method for obtaining the data in the data field based on the incorrectly received MAC PDU in this embodiment of the present invention is also abandoned, and therefore, the data processing method in this embodiment of the present invention is abandoned, so that a bit location of a correctly received RLC segment is not misplaced. The lost RLC PDU is usually one or two subflow B segments. Certainly, this may not be specifically limited in some embodiments.

A specific method for obtaining the speech payload from the target MAC PDU may vary with a specific location of the lost RLC PDU in the to-be-assembled PDCP PDU. Details are as follows.

1.1. When the Lost RLC PDU is not Located at an End Location in the to-be-Assembled PDCP PDU Example 1

One RLC PDU is Lost

Step C1: When the lost RLC PDU is not located at the end location in the to-be-assembled PDCP PDU and one RLC PDU is lost, obtain a length of a speech payload of the lost RLC PDU through calculation based on a length of speech data of a correctly received RLC PDU and a preset speech frame length.

After the RLCSNs of all the RLC PDUs in the to-be-assembled PDCP PDU are obtained, a specific location of the lost RLC PDU in the to-be-assembled PDCP PDU may be determined based on an RLCSN of the lost RLC PDU. The speech frame length may be preset. Alternatively, by parsing the successfully assembled PDCP PDU, the base station can learn of the current bit rate and the ROHC switch information, so as to learn of the speech frame length.

The length Lm of the speech payload of the lost RLC PDU is calculated based on the correctly received RLC PDU and the speech frame length. For example, the length of the speech payload of the lost RLC PDU can be obtained by subtracting the total length of the speech data of the correctly received RLC PDU from the preset speech frame length.

Step C2: For the target MAC PDU, extract, from back to front, a speech payload whose length is equal to the length of the speech payload.

For the selected target MAC PDU, the length Lm of the speech payload is extracted from back to front. The length of the speech payload is a length of the RLC PDU carried in the target MAC PDU. Because a (MAC+RLC) header length of the MAC PDU is uncertain, it is difficult to determine a start location of data. However, the speech payload in the target MAC PDU can be obtained in a manner in which data is extracted from back to front in this embodiment of the present invention.

Example 2

A Plurality of RLC PDUs are Lost

The obtaining the speech payload from the target MAC PDU includes the following steps.

Step D1: When the lost RLC PDUs are not located at the end location in the to-be-assembled PDCP PDU, determine a MAC header length of the target MAC PDU.

The base station first determines the header length of the target MAC PDU, to prepare for removal of the header length. For example, whether the MAC header includes a short period BSR (buffer status report) is determined based on whether a periodic BSR_Timer expires. By observing packet capture data in an existing network, if a MAC PDU to which an RLC PDU located at a middle location belongs includes a periodic BSR, the periodic BSR is a short period BSR.

The periodic BSR_Timer is a periodic BSR timer. Each time a BSR is reported, the timer is reset, and reporting a BSR is triggered when the timer exceeds a preset period. Currently, a BSR report period is set to 10 ms.

Step D2: Remove the MAC header length and a preset RLC header length of the target MAC PDU to obtain the speech payload.

The RLC header length may be learned in advance. After the MAC header length is determined, the MAC header length and the preset RLC header length may be removed from the target MAC PDU, and obtained data is the speech payload in the target MAC PDU.

For example, if the target MAC PDU includes a short period BSR, the MAC header length is three bytes. Otherwise, the MAC header length is one byte. The speech payload is obtained by removing the MAC header length and the RLC header length from the MAC PDU. When a length of an RLCSN is 10 bits, the RLC header length is two bytes.

It may be understood that the obtaining method in Example 2 is particularly applicable to a scenario in which a plurality of RLC PDUs are lost. When one RLC PDU is lost, the method in Example 1 may be used, or the method in Example 2 may be used.

A specific method for determining, based on whether the periodic BSR_Timer expires, whether the MAC header includes the short period BSR is as follows:

determining, in one or more first MAC PDUs, a MAC PDU that is followed by the target MAC PDU and that includes a short period BSR; and then, determining whether a period between the receiving moment of the target MAC PDU and a receiving moment of the previous MAC PDU that includes the short period BSR exceeds the preset periodic BSR_Timer.

If the period between the receiving moment of the target MAC PDU and the receiving moment of the previous MAC PDU that includes the short period BSR exceeds the preset periodic BSR_Timer, the periodic BSR_Timer expires, and the MAC header includes the short period BSR.

In other words, if the period between the receiving moment of the target MAC PDU and the receiving moment of the previous MAC PDU that includes the short period BSR exceeds the preset periodic BSR_Timer, it is determined that the MAC header length of the target MAC PDU is three bytes. If the period between the receiving moment of the target MAC PDU and the receiving moment of the previous MAC PDU that includes the short period BSR does not exceed the preset periodic BSR_Timer, it is determined that the MAC header length of the target MAC PDU is one byte.

In some embodiments of the present invention, when the plurality of RLC PDUs are lost, speech payloads of most lost RLC PDUs may be obtained by using the method in Example 2, and the method in Example 1 is performed until there is one RLC PDU left.

The foregoing descriptions in 1.1 are about a speech payload recovery method in which the lost RLC PDU segment belongs to the subflow B and is not located at the end location in the to-be-assembled PDCP PDU. A speech payload recovery method described in 1.2 is used for a case in which the lost RLC PDU segment belongs to the subflow B and is located at the end location in the to-be-assembled PDCP PDU.

1.2. When the Lost RLC PDU is Located at an End Location in the to-be-Assembled PDCP PDU When the lost RLC PDU is located at the end location in the to-be-assembled PDCP PDU, the obtaining the speech payload from the target MAC PDU includes the following steps.

Step E1: When the lost RLC PDU is located at the end location in the to-be-assembled PDCP PDU, determine an end location and a start location of the speech payload in the target MAC PDU.

Because the RLC PDU in the target MAC PDU is the lost RLC PDU in the to-be-assembled PDCP PDU, and the lost RLC PDU is located at the end location in the to-be-assembled PDCP PDU, the target MAC PDU may include a filling bit at an end of the target MAC PDU in addition to the MAC header, the RLC header, and the speech payload in the data field. Therefore, after the start location and the end location of the speech payload in the target MAC PDU are determined, the speech payload can be accurately extracted.

Step E2: Extract the speech payload from the target MAC PDU based on the start location and the end location.

As described above, after the start location and the end location of the speech payload in the target MAC PDU are determined, data located between the start location and the end location can be extracted from the target MAC PDU, and the obtained data is the speech payload.

There are a plurality of methods for determining the end location and the start location of the speech payload in the target MAC PDU. The following example is provided.

Step D1: Calculate a length of a speech payload of the lost RLC PDU based on a preset speech frame length and a length of speech data of an RLC PDU that is not located at the end location in the to-be-assembled PDCP PDU.

Step D2: Determine, in one or more first MAC PDUs, a MAC PDU that is followed by the target MAC PDU and that includes a short period BSR.

Step D3: Determine whether a period between the receiving moment of the target MAC PDU and a receiving moment of the previous MAC PDU that includes the short period BSR exceeds a preset periodic BSR_Timer. If the period between the receiving moment of the target MAC PDU and the receiving moment of the previous MAC PDU that includes the short period BSR does not exceed the preset periodic BSR_Timer, step D4 is performed. If the period between the receiving moment of the target MAC PDU and the receiving moment of the previous MAC PDU that includes the short period BSR exceeds the preset periodic BSR_Timer, step D5 is performed.

Step D2 and step D3 are specific implementation methods for determining, based on whether the periodic BSR_Timer expires, whether the MAC header includes a periodic BSR.

Step D4: Determine that a MAC header length of the target MAC PDU is one byte.

Step D5: Determine, based on an obtained TB size and the length of the speech payload of the lost RLC PDU, a type of the periodic BSR included in the MAC header of the target MAC PDU and a padding length of filling bits.

Types of the periodic BSR include a long BSR and a short BSR. The type of the BSR affects the MAC header length, and further affects whether there is a filling bit.

Step D6: Determine the MAC header length of the target MAC PDU based on the type of the BSR.

Step D7: Determine the end location of the speech payload in the target MAC PDU based on the length of the filling bit.

For example, the length of the filling bit and the type of the BSR are inferred based on the obtained TB Size, a determined part of the MAC header length, an RLC header length, and the payload length Lm. To be specific, a length of each part is inferred based on a relationship: "a header length of each MAC control element+a data payload length+a filling length=a TB size". For example, it is set that Lremain=TB size-7×8−Lm. If Lremain<16, the type of the BSR is a short BSR, the MAC header length is five bytes, and the length of the filling bit is Lremain. If Lremain=16, the type of the BSR is a long BSR, the MAC header length is five bytes, and there is no filling bit. If Lremain>16, the type of the BSR is a long BSR, the MAC header length is seven bytes, and the length of the filling bit is Lremain−16. After the length of the filling bit is determined, the end location of the speech payload is determined. "7×8" indicates that the MAC header length is seven bytes, namely, 56 bits in the following case: "a short BSR, filling" or "a long BSR, no filling".

Step D8: Determine the start location of the speech payload in the target MAC PDU based on the MAC header length and the preset RLC header length.

After the start location and the end location of the speech payload in the target MAC PDU are determined, the speech payload can be extracted from the target MAC PDU based on the start location and the end location.

In the foregoing method, the data in the data field is obtained based on the incorrectly received MAC PDU. To be specific, the RLC PDU in the MAC PDU whose CRC check is incorrect is reserved. Even if a data error occurs during transmission of the RLC PDU, data of the speech payload of the incorrectly received RLC PDU is reserved, so that a recovered RLC PDU is constructed, and the corresponding PDCP PDU can be reserved. The following describes another method for obtaining the data in the data field of the RLC PDU.

2. A Preset Bit Sequence is Used as the Data in the Data Field

The data in the data field of the RLC PDU may be obtained in the following manner.

When the lost RLC PDU is located at an end location in the to-be-assembled PDCP PDU, the length of the speech payload of the lost RLC PDU is calculated based on the preset speech frame length and a length of speech data of an RLC PDU that is not located at the end location in the to-be-assembled PDCP PDU. For example, the length of the speech payload of the lost RLC PDU may be obtained by subtracting a length of a speech payload of a received RLC PDU from a preset speech frame length in a current mode. Then, when the length of the speech payload is less than a preset length threshold, an all-zero sequence whose length matches the length of the speech payload is obtained.

All RLC PDUs that are not located at the end location may be correctly received RLC PDUs, or may include both the correctly received RLC PDUs and an RLC PDU obtained in the recovery manner in 1.1, to be specific, an RLC PDU generated based on data in a data field of the RLC PDU that is obtained by using the foregoing method when the lost RLC PDU is not located at the end location in the to-be-assembled PDCP PDU.

It can be learned from the foregoing descriptions of the content related to the format of the speech frame that an RLC PDU located at the end location in the PDCP PDU is less significant speech data. Even if the data includes an error, subjective experience of a user with speech data constructed by the data that includes an error is not greatly affected. Therefore, the preset bit sequence may be directly used to recover the speech data of the lost RLC PDU. In addition to the all-zero sequence, the preset bit sequence may be an all ones bit sequence, or another 0-1 bit sequence. This is not specifically limited in this embodiment of the present invention provided that after a length of a speech payload of the RLC PDU located at the end location is calculated based on the correctly received RLC PDUs or the recovered RLC PDU, a length of the preset bit sequence used for recovery is equal to the length of the speech payload. In this way, efficiency of generating the recovered RLC PDU may be improved. To further reduce impact of the data that includes an error on the speech frame, a determining step is further added in this embodiment of the present invention. To be specific, the method in which the preset bit sequence is used as the data in the data field is performed only when the length of the speech payload of the lost RLC PDU is not greater than a secure length threshold.

In some embodiments of the present invention, when the lost RLC PDU is located at the end location in the to-be-assembled PDCP PDU, in order to adaptively select an RLC PDU recovery method that is efficiently performed and in which error bits are reduced, after the length of the speech payload of the lost RLC PDU is calculated based on the preset speech frame length and the length of the speech data of the RLC PDU that is not located at the end location in the to-be-assembled PDCP PDU, the length of the speech payload of the lost RLC PDU and the preset secure length threshold may be used for determining. When the length of the speech payload of the lost RLC PDU is greater than the secure length threshold, the foregoing method in 1.2 is performed. If the length of the speech payload of the lost RLC PDU is not greater than the secure length threshold, the foregoing method in 2 is performed, to recover the RLC PDU located at the end location.

For the foregoing methods for obtaining the data in the data field of the RLC PDU, one method is performed based on the incorrectly received MAC PDU, and the other method is performed by using the preset bit sequence as the data in the data field for the RLC PDU located at the end location. The following provides another method for obtaining the data in the data field of the RLC PDU.

3. A Random Bit Sequence is Used as the Data in the Data Field

To be specific, the obtaining the data in the data field of the RLC PDU includes the following steps.

Step E1: Calculate a length of a speech payload of the lost RLC PDU based on a length of speech data of a correctly received RLC PDU and a preset speech frame length.

The base station may obtain the length of the speech payload of the lost RLC PDU through calculation by subtracting the length of the speech data of the correctly received RLC PDU in the to-be-assembled PDCP PDU from the preset speech frame length. There may be one or more lost RLC PDUs. When a plurality of RLC PDUs are lost, the length, of the speech payload, that is obtained through calculation is a set of lengths of speech payloads of all the lost RLC PDUs.

Step E2: Obtain a random bit sequence whose length matches the length of the speech payload.

After calculating the length of the speech payload of the lost RLC PDU, the base station obtains the random bit sequence whose length is equal to the length of the speech payload of the lost RLC PDU, and uses the random bit sequence as data in a data field of a recovered RLC PDU.

The foregoing method in which the random bit sequence is used as the data in the data field can be used as an alternative to the method for obtaining the data in the data field of the RLC PDU based on the incorrectly received MAC PDU. For detailed descriptions of the method 3, refer to the following descriptions of the embodiment shown in FIG. 5.

Step 408: Obtain an RLC header.

When the preset RLC PDU in the to-be-assembled PDCP PDU is lost, the base station further needs to obtain the RLC header, and uses the RLC header to obtain the recovered RLC PDU. The RLC header includes an RLCSN and FI.

Optionally, to accurately obtain the RLC header, in some embodiments of the present invention, step 408 may be implemented in the following manner:

determining the RLCSN of the RLC header based on an RLCSN of a correctly received RLC PDU that is located before the lost RLC PDU and/or an RLCSN of a correctly received RLC PDU that is located after the lost RLC PDU. When the lost RLC PDU is located at an end location in the to-be-assembled PDCP PDU, it is determined that the FI of the RLC header is 10. When the lost RLC PDU is not located at the end location in the to-be-assembled PDCP PDU, it is determined that the FI of the RLC header is 11.

Therefore, the RLCSN of the lost segment can be accurately inferred based on the correctly received RLC PDU that is located before the lost RLC PDU and the correctly received RLC PDU that is located after the lost RLC PDU. The FI is determined based on whether the lost RLC PDU is a last segment in the PDCP PDU to which the lost RLC PDU belongs.

Step 409: Generate the recovered RLC PDU by using the RLC header and the data in the data field.

After the data in the data field of the RLC PDU and the RLC header are obtained by using the foregoing method, the recovered RLC PDU may be generated based on the two pieces of data. The recovered RLC PDU may be used to replace the lost RLC PDU in the to-be-assembled PDCP PDU. Therefore, when an RLC PDU at a PDCP layer of the base station is lost, the base station can still obtain all the RLC PDUs in the to-be-assembled PDCP PDU.

For example, the base station constructs a valid RLC PDU based on the obtained speech payload and with reference to the inferred RLCSN and the flag FI, and writes the valid RLC PDU into the RLC_Buffer that is used for to-be-performed packet assembly. The RLC_Buffer is a buffer that is at the RLC layer and that is used to store an RLC PDU that is correctly received and that is used for to-be-performed packet assembly.

Step 410: Generate the PDCP PDU based on the correctly received RLC PDU and the recovered RLC PDU.

In this way, the base station includes both the correctly received RLC PDU in the to-be-assembled PDCP PDU and the recovered RLC PDU used to recover the lost RLC PDU. Therefore, no RLC PDU in the to-be-assembled PDCP PDU in which the RLC PDU is originally lost is lost, and the base station can generate the PDCP PDU based on the correctly received RLC PDU and the recovered RLC PDU.

For example, by performing the foregoing method, the RLC_Buffer of the base station is updated. The RLC_Buffer includes both the correctly received RLC PDU and the recovered RLC PDU. Therefore, the PDCP PDU can be assembled based on a normal packet assembly procedure.

In conclusion, the at least one correctly received RLC PDU in the to-be-assembled PDCP PDU is obtained. The correctly received RLC PDU is the RLC PDU that belongs to the MAC PDU on which the CRC check is correct. Then, it is determined whether the RLC PDU in the to-be-assembled PDCP PDU is lost. If the RLC PDU in the to-be-assembled PDCP PDU is lost, the data in the data field of the RLC PDU is obtained, and the RLC header is obtained. Then, after the recovered RLC PDU is generated by using the RLC header and the data in the data field, the PDCP PDU is generated based on the correctly received RLC PDU and the recovered RLC PDU. In this way, when the RLC PDU in the PDCP PDU is lost, the recovered RLC PDU is generated to recover the lost RLC PDU, and the PDCP PDU can be obtained by assembling the recovered RLC PDU and the correctly received RLC PDU. Therefore, the PDCP PDU in which the RLC PDU is lost is prevented from being discarded, and the PDCP packet is reserved, thereby reducing a data loss and improving integrity of frame data. When the user uses data related to the PDCP PDU, subjective experience of the user can be improved.

The embodiment shown in FIG. 4 mainly provides the method for recovering the lost RLC PDU based on the incorrectly received MAC PDU. The following provides another method for recovering a lost RLC PDU by using a random bit sequence. In the method shown in FIG. 4, the incorrectly received MAC PDU determined through a CRC check needs to be stored. For example, a buffer area ErrorBuffer is set at the RLC layer to buffer the incorrectly received MAC PDU. Then, the incorrectly received MAC PDU in the ErrorBuffer is used to recover the lost RLC PDU during subsequent packet assembly. In the embodiment shown in FIG. 5, the buffer area ErrorBuffer does not need to be used. Instead, data in a data field of the lost RLC PDU is recovered by directly using the random bit sequence. For example, in an AMR scenario, AMR has relatively good error tolerance robustness for the subflow B bit. Even if a BER of the subflow B bit reaches 50%, a MOS score still obtains a positive gain. This provides a basis for a random recovery scheme. In the embodiment shown in FIG. 5, any quantity of lost RLC PDUs that belong to the subflow B segment may be recovered.

Figure 5:
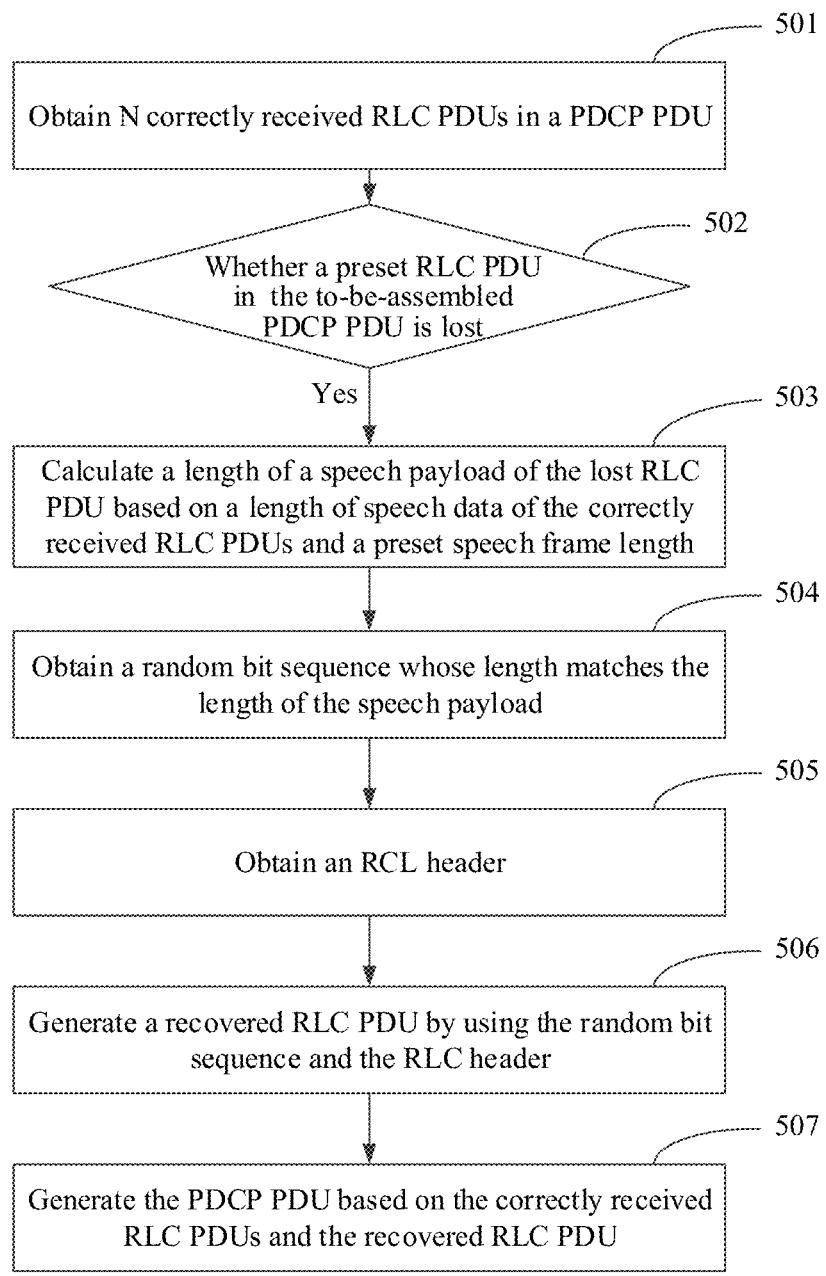
FIG. 5 is a method flowchart of a data processing method according to an embodiment of the present invention.

FIG. 5 is a method flowchart of a data processing method according to an embodiment of the present invention. Referring to FIG. 5, the method in this embodiment of the present invention includes the following steps.

Step 501: Obtain N correctly received RLC PDUs in a PDCP PDU.

The correctly received RLC PDU is an RLC PDU that belongs to a MAC PDU on which a CRC check is correct, and N is a positive integer.

Step 501 may be implemented by performing step 401 and step 404 in the foregoing embodiment. For details, refer to detailed descriptions in step 401 and step 404.

Step 502: Determine whether a preset RLC PDU in the to-be-assembled PDCP PDU is lost. If the RLC PDU in the to-be-assembled PDCP PDU is lost, step 503 is performed.

The preset RLC PDU is an RLC PDU whose bit in a speech payload belongs to a subflow B. There may be one or more lost preset RLC PDUs.

For step 502, refer to detailed descriptions in step 406.

For example, when RLC expiration packet assembly of QCI 1 is triggered, a start RLC PDU and an end RLC PDU in the to-be-assembled PDCP PDU need to be found within an RLC packet range, and a flag of a subflow A or a subflow B of each RLC PDU need to be determined. It is determined whether only an RLC PDU that belongs to the subflow B and that is in the to-be-assembled PDCP PDU is lost. If only the RLC PDU that belongs to the subflow B and that is in the to-be-assembled PDCP PDU is lost, step 503 is performed. Otherwise, it is determined, within the RLC packet range, whether an RLC PDU that belongs to the subflow B and that is in another to-be-assembled PDCP PDU is lost, and so on.

In some embodiments of the present invention, step 502 may be determining whether an RLC PDU in the to-be-assembled PDCP PDU is lost. Alternatively, the preset RLC PDU has another definition.

Step 503: Calculate a length of a speech payload of the lost RLC PDU based on a length of speech data of the correctly received RLC PDUs and a preset speech frame length.

Step 504: Obtain a random bit sequence whose length matches the length of the speech payload.

After the base station determines the length of the speech payload of the lost RLC PDU, the base station may obtain only the random bit sequence whose length is equal to the length of the speech payload. The obtained random bit sequence may be used as the speech payload of the lost RLC PDU.

Step 503 and step 504 are a specific method for obtaining data in a data field of the RLC PDU.

There may be one or more lost RLC PDUs. In other words, a quantity of RLC PDUs that belong to the subflow B and that are recovered by using random bit sequences is not limited, provided that the PDCP PDU obtained based on an RLC PDU obtained through recovery and the correctly received RLC PDUs is of a valid speech frame length after recovery.

When one RLC PDU is lost, the random bit sequence whose length matches the length of the speech payload is directly used as the speech payload of the lost RLC PDU. When a plurality of RLC PDUs are lost, a specific implementation method for obtaining random bit sequences whose lengths match a length of speech payloads is as follows: obtaining a plurality of random bit sequences of a preset length or random lengths, where a total length of the plurality of random bit sequences is equal to the length of the speech payloads. For example, when three RLC PDUs are lost, after a total length of speech payloads of all the lost RLC PDUs is calculated, the length of the speech payloads is divided into three equal parts, and then three random bit sequences whose lengths are equal to lengths of the three equal parts respectively are obtained. Alternatively, three random bit sequences of random lengths are obtained, provided that a total length of the three random bit sequences is equal to the total length of the speech payloads of the lost RLC PDUs.

For example, a loss of the RLC PDU may be classified into the following three cases.

Figure 6A:
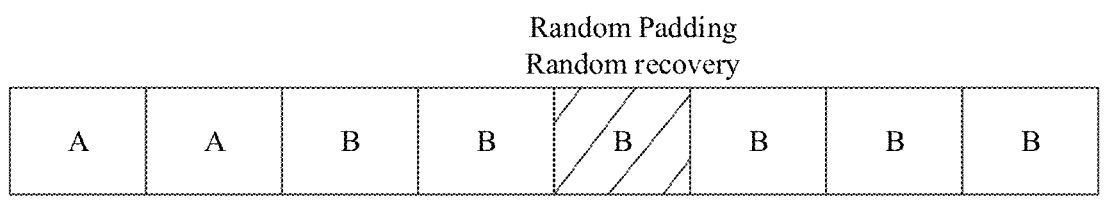
FIG. 6a is a schematic diagram of a case in which only one subflow B segment is lost according to an embodiment shown in FIG. 5.

I. Only one RLC PDU that belongs to a subflow B segment and that is in the to-be-assembled PDCP PDU is lost, as shown in FIG. 6a. After a speech payload of the lost RLC PDU is determined, a random 0-1 bit sequence is used for filling. In this case, a location of the lost speech payload in the to-be-assembled PDCP PDU can be determined based on a correctly received RLC segment.

Figure 6B:
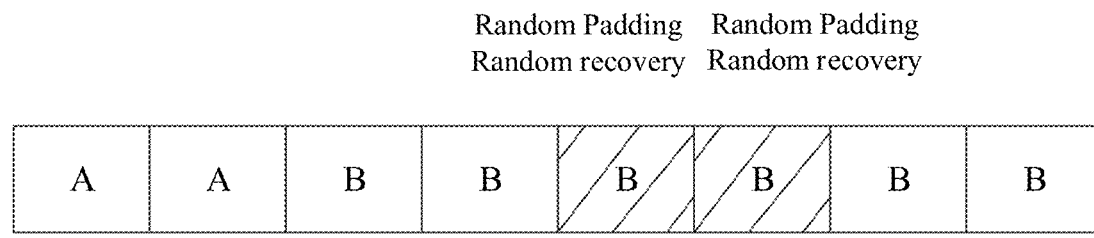
FIG. 6b is a schematic diagram of a case in which a plurality of consecutive subflow B segments are lost according to an embodiment shown in FIG. 5.

II. A plurality of consecutive RLC PDUs that belong to a subflow B segment and that are in the to-be-assembled PDCP PDU are lost, as shown in FIG. 6b. After speech payloads of the lost RLC PDUs are determined, random 0-1 bit sequences are used to fill data in data fields of the RLC PDUs. In this case, similar to the case I, locations of the lost speech payloads in the to-be-assembled PDCP PDU can also be determined.

Figure 6C:
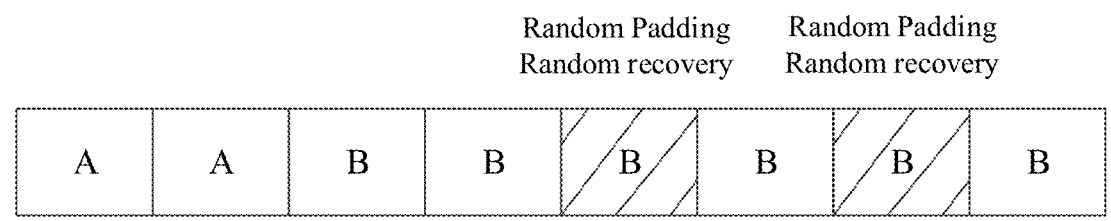
FIG. 6c is a schematic diagram of a case in which a plurality of inconsecutive subflow B segments are lost according to an embodiment shown in FIG. 5.

III. A plurality of inconsecutive RLC PDUs that belong to a subflow B segment and that are in the to-be-assembled PDCP PDU are lost, as shown in FIG. 6c. In this case, a random 0-1 bit sequence is used to recover a subflow B corresponding to each lost RLC PDU, and a length of the subflow B corresponding to each segment may be selected flexibly, provided that a total length of lost and recovered subflows B is equal to a total length of speech payloads of the lost RLC PDUs. In this way, in the to-be-assembled PDCP PDU, although a shift of speech data of a correct RLC PDU located between the inconsecutive lost subflow B segments is caused, emulation indicates that processing in such a way has little effect and does not introduce a negative gain, and a probability of this case is relatively low.

Step 505: Obtain an RLC header.

For step 505, refer to detailed descriptions in step 408.

Step 506: Generate a recovered RLC PDU by using the random bit sequence and the RLC header.

For step 506, refer to detailed descriptions in step 409. The random bit sequence is the data in the data field of the RLC PDU.

For example, the correct RLC header is added to the speech payload, of the RLC PDU, that is randomly recovered, to construct a valid recovered RLC PDU, and write the valid recovered RLC PDU into an RLC_Buffer that is used for to-be-performed packet assembly.

Step 507: Generate the PDCP PDU based on the correctly received RLC PDUs and the recovered RLC PDU.

The PDCP PDU includes M RLC PDUs, M is a positive integer, and N<M. In other words, the N correctly received RLC PDUs and (M−N) recovered RLC PDUs are assembled to obtain the PDCP PDU.

For step 507, refer to detailed descriptions in step 410.

For example, if a current PDCP PDU is not a last PDCP in an RLC packet range in the RLC_Buffer, step 502 is performed. Otherwise, for the RLC_Buffer that is updated, the PDCP can be assembled based on a normal packet procedure.

In conclusion, according to the data processing method in this embodiment of the present invention, at least one correctly received RLC PDU in the to-be-assembled PDCP PDU is obtained. The correctly received RLC PDU is an RLC PDU that belongs to a MAC PDU on which a CRC check is correct. Then, it is determined whether the RLC PDU in the to-be-assembled PDCP PDU is lost. If the RLC PDU in the to-be-assembled PDCP PDU is lost, the data in the data field of the RLC PDU is obtained, and the RLC header is obtained. Then, after the recovered RLC PDU is generated by using the RLC header and the data in the data field, the PDCP PDU is generated based on the correctly received RLC PDU and the recovered RLC PDU. In this way, when the RLC PDU in the PDCP PDU is lost, the recovered RLC PDU is generated to recover the lost RLC PDU, and the PDCP PDU can be obtained by assembling the recovered RLC PDU and the correctly received RLC PDU. Therefore, the PDCP PDU in which the RLC PDU is lost is prevented from being discarded, and the PDCP packet is reserved, thereby reducing a data loss and improving integrity of frame data. When a user uses data related to the PDCP PDU, subjective experience of the user can be improved.

The foregoing data processing method is performed, so that a specific BER is allowed when packet assembly is performed at an RLC layer, and an entire PDCP packet is prevented from being discarded. Therefore, more valid speech bits are reserved, thereby improving subjective experience of speech. This implements unequal protection of data.

It may be understood that the data processing method in this embodiment of the present invention is applicable to a QCI1 service and a QCI2 service. In addition to an AMR speech, the method is applicable to another speech encoding/decoding system such as an EVS, and any scenario in which priority and significance can be distinguished during sending of a higher layer packet or a lower layer packet of a video telephony service or a wireless video service.

Figure 7:
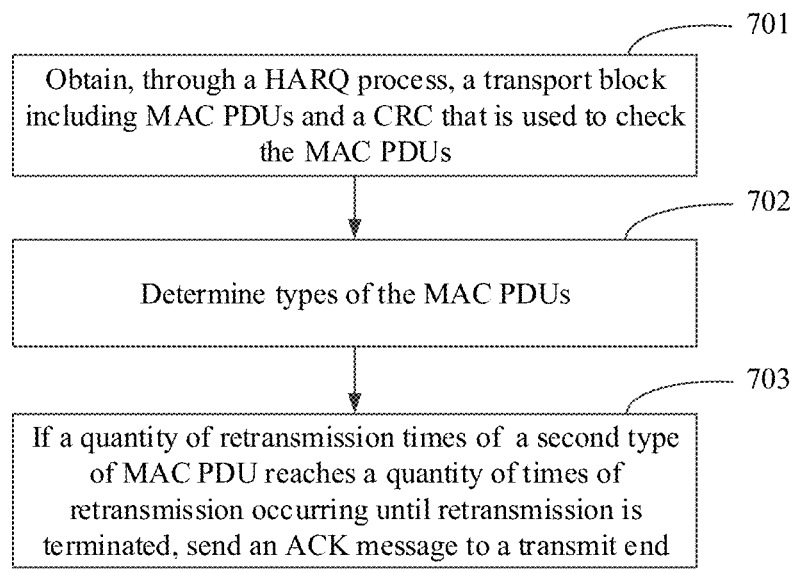
FIG. 7 is a method flowchart of a retransmission termination method according to an embodiment of the present invention.

In some embodiments of the present invention, a retransmission termination scheme is further provided, for example, an embodiment shown in FIG. 7. The retransmission termination method may be implemented in cooperation with the foregoing method for recovering the lost RLC PDU. For example, the retransmission termination method in the embodiment shown in FIG. 7 may be performed before step 406. Alternatively, the method shown in FIG. 7 may be used independently. This is not specifically limited in this embodiment of the present invention.

An execution process of the retransmission termination method in the embodiment shown in FIG. 7 is as follows: obtaining a MAC PDU corresponding to a non-significant bit in a PDCP PDU; and if a quantity of retransmission times of the MAC PDU corresponding to the non-significant bit reaches a quantity of times of retransmission occurring until retransmission is terminated, sending an ACK message to a transmit end. The quantity of times of retransmission occurring until retransmission is terminated is less than a maximum quantity of retransmission times of the MAC PDU.

Specifically, FIG. 7 is a method flowchart of a retransmission termination method. Referring to FIG. 7, the method in this embodiment of the present invention includes the following steps.

Step 701: Obtain, through a HARQ process, a transport block including MAC PDUs and a CRC that is used to check the MAC PDUs.

A base station obtains the HARQ process at a physical layer, to obtain the transport block including the MAC PDUs and the CRC that is used to check the MAC PDUs. The MAC PDUs may include a MAC PDU corresponding to a non-significant bit and a MAC PDU corresponding to a significant bit. The MAC PDU corresponding to the non-significant bit is a MAC PDU whose quality parameter of a data bit is less than a preset quality threshold, such as a MAC PDU whose speech data bit belongs to a subflow B bit. Correspondingly, the MAC PDU corresponding to the significant bit is a MAC PDU whose quality parameter of a data bit is greater than the preset quality threshold, such as a MAC PDU whose speech data bit belongs to a subflow A bit.

Step 701 may be specific implementation of step 401.

Step 702: Determine types of the MAC PDUs.

The types of the MAC PDUs include a first type and a second type. The first type of MAC PDU includes a significant bit in a PDCP PDU, namely, the MAC PDU corresponding to the significant bit. The second type of MAC PDU includes a non-significant bit in the PDCP PDU, namely, the MAC PDU corresponding to the non-significant bit. A maximum quantity of retransmission times corresponding to the first type is greater than a quantity of times, of retransmission occurring until retransmission is terminated, that is corresponding to the second type. The quantity of times of retransmission occurring until retransmission is terminated is less than a maximum quantity of retransmission times of the MAC PDU. The maximum quantity of retransmission times of the MAC PDU is a maximum quantity of retransmission times set by a system, and the maximum quantity of retransmission times of the MAC PDU and the maximum quantity of retransmission times corresponding to the first type may be a same value.

For example, the first type is a type in which speech data of a MAC PDU belongs to the subflow A bit, and the second type is a type in which speech data of a MAC PDU belongs to the subflow B bit. The maximum quantity of retransmission times corresponding to the first type is greater than the quantity of times, of retransmission occurring until retransmission is terminated, that is corresponding to the second type. For example, when the first type is the type in which the speech data of the MAC PDU belongs to the subflow A bit, and the second type is the type in which the speech data of the MAC PDU belongs to the subflow B bit, the maximum quantity of retransmission times corresponding to the first type is greater than the quantity of times, of retransmission occurring until retransmission is terminated, that is corresponding to the second type. The maximum quantity of retransmission times corresponding to the first type may be a maximum quantity of retransmission times set by a communications system, and the quantity of times, of retransmission occurring until retransmission is terminated, that is corresponding to the second type is a preset value.

After the types of the MAC PDUs are determined, a maximum quantity of retransmission times corresponding to a type of a MAC or a quantity of times, of retransmission occurring until retransmission is terminated, that is corresponding to a type of a MAC PDU may be obtained. When the MAC PDU is of the second type, it is detected whether a quantity of retransmission times of the MAC PDU of the second type reaches the quantity of times, of retransmission occurring until retransmission is terminated, that is corresponding to the second type. The determining types of the MAC PDUs includes the following steps.

Step F1: Obtain an SR (Scheduling Request) message on a PUCCH (physical uplink control channel).

Step F2: Determine, in a MAC PDU, a start RLC PDU in the to-be-assembled PDCP PDU based on the SR message.

A start segment in each PDCP PDU may be learned based on an SR message on the PUCCH.

Step F3: Determine, based on a TB size of the transport block, an average MAC header length, and an RLC header length, a length of speech data of an RLC PDU included in the transport block.

Step F4: Determine, based on a length of speech data of consecutively received RLC PDUs starting from the start RLC PDU, that a MAC PDU to which an RLC PDU located within a preset total length of a subflow A belongs is of the first type, and that a MAC PDU to which an RLC PDU located outside the preset total length of the subflow A belongs is of the second type. The total length of the subflow A is a length of speech data, of the to-be-assembled PDCP PDU, that belongs to the subflow A bit.

Step 703: If a quantity of retransmission times of the second type of MAC PDU reaches the quantity of times of retransmission occurring until retransmission is terminated, send an ACK message to a transmit end.

The base station determines, based on the CRC, that the second type of MAC PDU is transmitted incorrectly. In this case, the transmit end retransmits the MAC PDU. When the quantity of retransmission times of the second type of MAC PDU reaches the quantity of times of retransmission occurring until retransmission is terminated, the base station sends the ACK (acknowledgement) message to a sending device. The ACK message is used to stop the sending device from retransmitting the second type of MAC PDU that is transmitted incorrectly.

For example, when the types of the MAC PDUs are classified into a subflow A type and a subflow B type, a maximum quantity of transmission times corresponding to the subflow A type may be a set value, namely, a maximum quantity of retransmission times set by the system. A quantity of times, of retransmission occurring until retransmission is terminated, that is corresponding to the subflow B type is less than the maximum quantity of transmission times corresponding to the subflow A type, and the quantity of times, of retransmission occurring until retransmission is terminated, that is corresponding to the subflow B type is less than the maximum quantity of retransmission times set by the system, for example, a value set by a work personnel. There are two manners of determining the quantity of times, of retransmission occurring until retransmission is terminated, that is corresponding to the subflow B type: using a preset value that is less than the maximum quantity of transmission times corresponding to the subflow A; or adaptively determining a maximum quantity of retransmission times corresponding to a subflow B by comparing a BLER of a currently received subflow B with a preset BLER (block error rate) threshold. To be specific, if a BLER corresponding to retransmission of a MAC PDU of the subflow B type (the base station collects statistics about a BLER of each time of retransmission within a recent period) is less than the preset BLER threshold, retransmission may be terminated immediately. For example, if a channel condition is good, the BLER threshold may be met when the MAC PDU of the subflow B type is retransmitted for only three times. However, if a channel condition is poor, the BLER threshold may be met until the MAC PDU of the subflow B type is retransmitted for five times. The maximum quantity of retransmission times corresponding to the subflow B may be adjusted adaptively based on the channel condition.

When a quantity of retransmission times of the MAC PDU of the subflow B type reaches the quantity of times, of retransmission occurring until retransmission is terminated, that is corresponding to the subflow B type, the base station sends the ACK message to UE, so that the UE stops retransmitting the MAC PDU of the subflow B type, and there is no need to wait until the quantity of retransmission times of the MAC PDU reaches the maximum quantity of retransmission times set by the system, thereby terminating in advance the retransmission of the MAC PDU of the subflow B type.

In an LTE scenario, a HARQ transmission mechanism may cause an increase in a transmission latency at a higher layer. This phenomenon is particularly severe in a TTI Bundling scenario, and a high latency may cause an active packet loss at a PDCP layer. Losses of a large quantity of packets at the higher layer may also severely affect subjective experience of speech. An existing MAC processing mechanism gives equal transmission opportunities to data packets transmitted at a physical layer. However, in a VoLTE scenario, bits included in a speech frame have different significance. From a perspective of optimal transmission, speech bits of different significance may obtain different transmission opportunities (resources). A significant subflow (for example, the subflow A) should obtain more transmission opportunities than another subflow, and an appropriate reduction in transmission opportunities of a non-significant subflow may reduce a probability of a packet loss at the higher layer, thereby increasing an overall speech throughput.

In conclusion, according to the method in the embodiment shown in FIG. 7, a quantity of transmission times of the non-significant subflow can be reduced under a specific BER condition. In other words, a characteristic of "untimely termination" of transmission of the non-significant subflow is introduced, so that the MAC PDU of the subflow A type obtains more transmission opportunities, a probability of a PDCP packet loss at the higher layer is reduced, a speech throughput is increased, and eventually, subjective experience of speech is improved. The method in the embodiment shown in FIG. 7 is particularly applicable to the TTIB scenario.

To verify an effect of the foregoing methods, for example, in an AMR scenario, after the data processing methods provided in the embodiments of the present invention are performed, an execution effect is verified through a test.

I. Error Tolerance Capability Emulation for Different Subflows in AMR

When an error occurs in a subflow A in AMR, subjective experience of speech is greatly affected, and a decoder may be abnormal. Therefore, the subflow A is considered to be very important, a BER (bit error ratio) should be strictly controlled at 0, so that emulation is not required here.

Figure 8A:
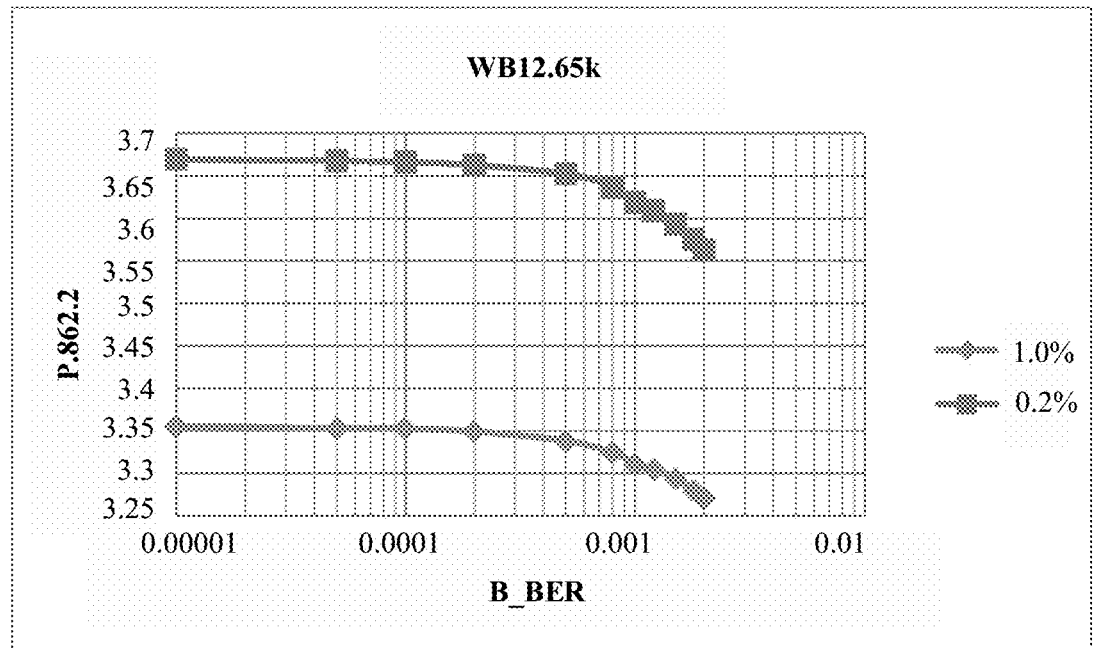
FIG. 8a is a schematic diagram of a MOS score of a subflow B that includes an error bit when AMR-WB is 12.65 k according to an embodiment of the present invention.
Figure 8B:
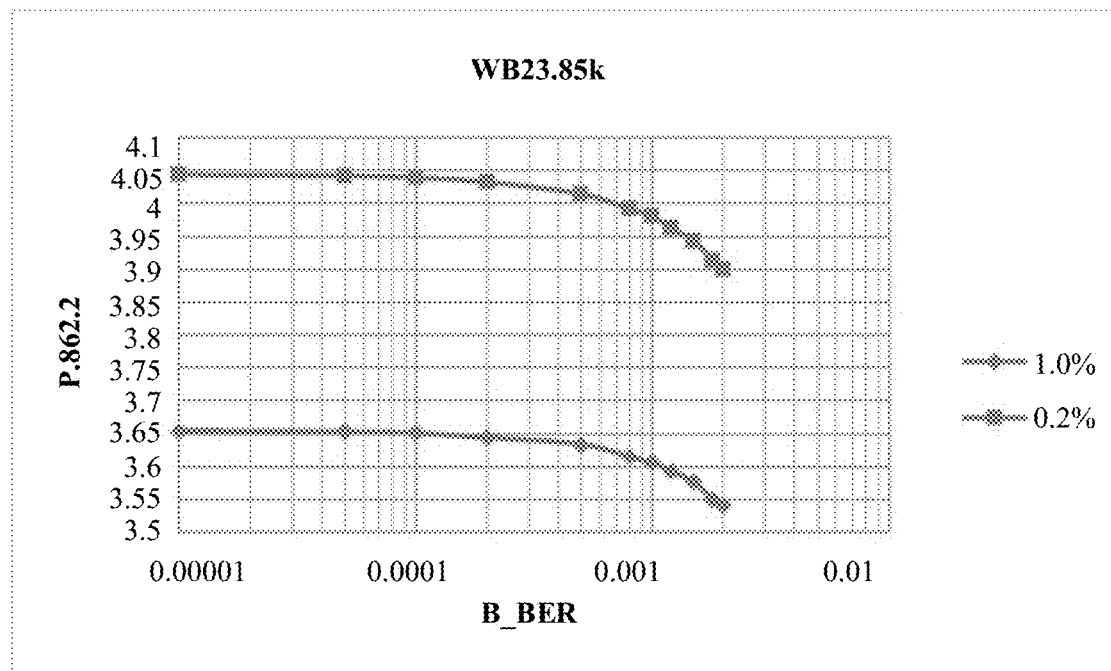
FIG. 8b is a schematic diagram of a MOS score of a subflow B that includes an error bit when AMR-WB is 23.85 k according to an embodiment of the present invention.

FIG. 8a and FIG. 8b respectively show impact, on a MOS (mean opinion score) score, of a subflow B that includes a specific error bit (BER is not equal to 0) when speech rates are respectively 12.65 k and 23.85 k in AMR-WB and packet loss rates (FER) at a higher layer are respectively 1% and 0.2%. The MOS in the figure is a mean opinion score, and Es/N0 is a ratio of symbol energy to noise power spectral density.

Both FIG. 8a and FIG. 8b indicate that when a packet loss rate at the higher layer is specified, and when the BER of the subflow B is not equal to 0, if the BER is controlled within a specific range, impact on subjective experience of speech can be negligible.

Figure 8C:
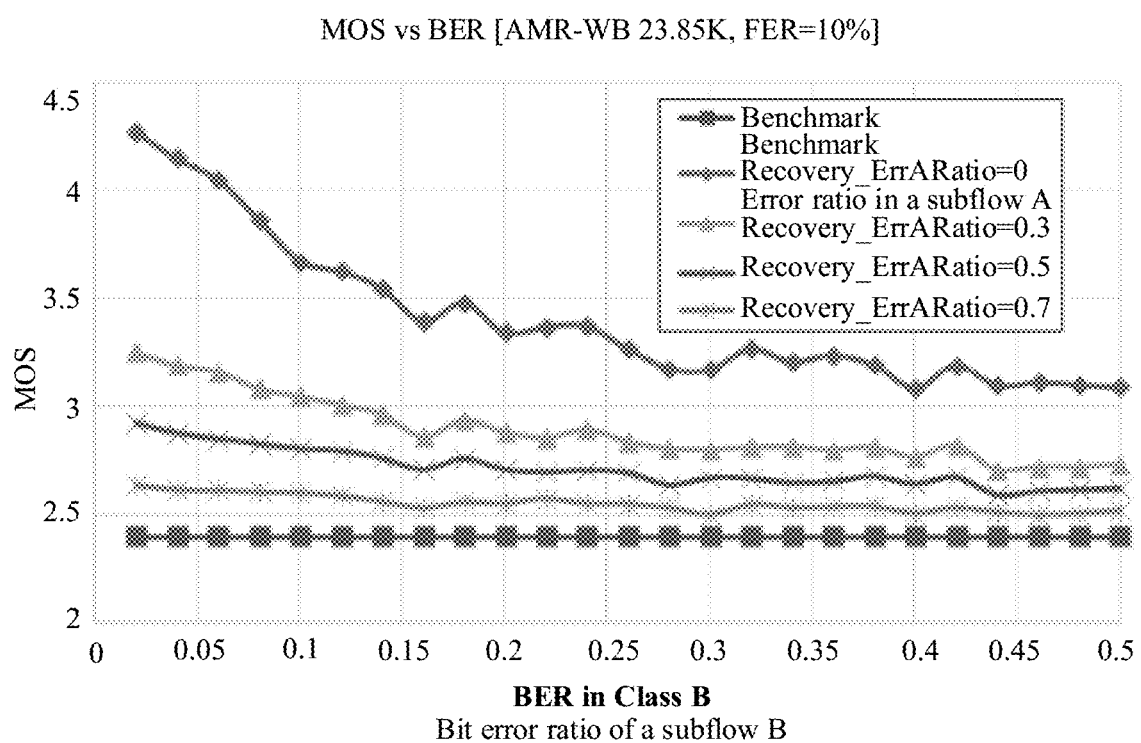
FIG. 8c is a schematic diagram of a MOS-vs-BER curve according to an embodiment of the present invention.

FIG. 8c shows that a MOS score varies with a BER of a subflow B when a FER=10% and when an error rate of a subflow A=0, 30%, 50%, and 70%. A benchmark shows a MOS score when an entire PDCP PDU is discarded. The result shows that AMR has relatively good error tolerance robustness for a bit in a subflow B. Even if the BER of the subflow B reaches 50%, the MOS score still obtains a positive gain. This provides a basis for the data processing methods provided in the embodiments of the present invention.

2. Emulation Verification of the Data Processing Methods
A channel type: an ETU70 channel.
A speech service: an AMR WB service whose rate is set to 12.65 k and 23.85 k separately.
An assessment manner: observing a change of a MOS score with a change of channel quality.
Horizontal coordinate: an EsNO normalized value representing an average value of current channel quality.
Vertical coordinate: a MOS score measured directly by using P863-Ploqa.

Figure 9A:
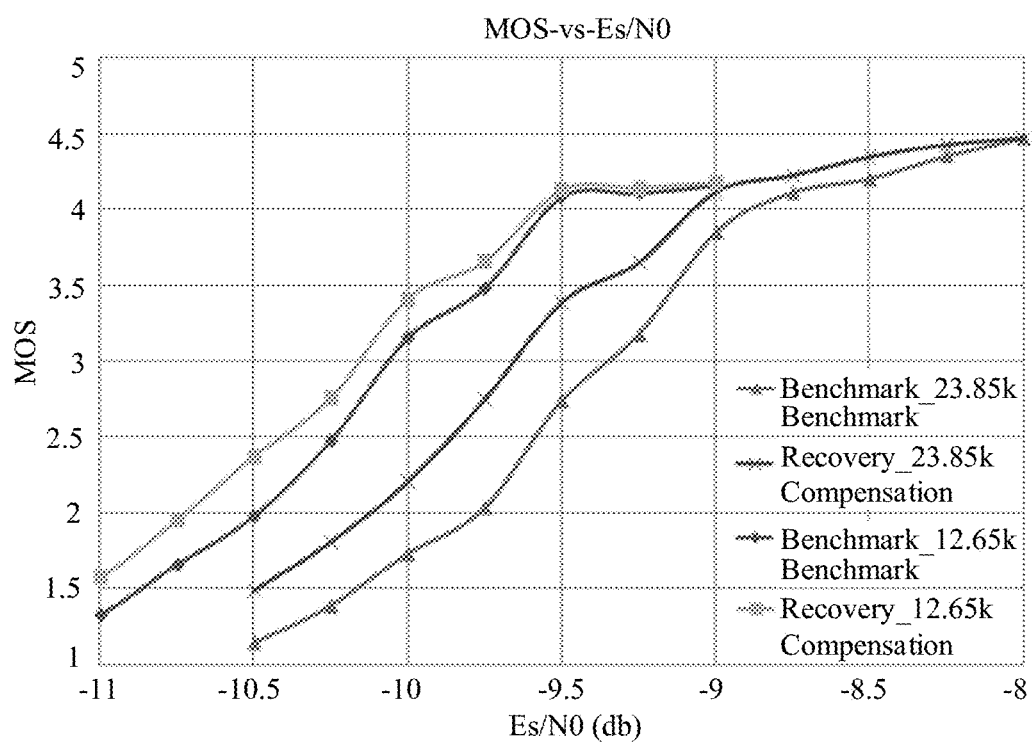
FIG. 9a is a diagram of gains of a data processing method according to an embodiment of the present invention.

FIG. 9a is a diagram of gains of a data processing method according to an embodiment of the present invention. The data processing method is specifically the data processing method in which the data in the data field is obtained based on the incorrectly received MAC PDU in the methods shown in FIG. 4. A curve of recovery in the figure is a curve generated according to the data processing methods in the embodiments of the present invention.

It can be learned from FIG. 9a that:

under a same EsNO/same channel quality condition, the MOS score is obviously improved after the data processing methods provided in the embodiments of the present invention are used.

Figure 9B:
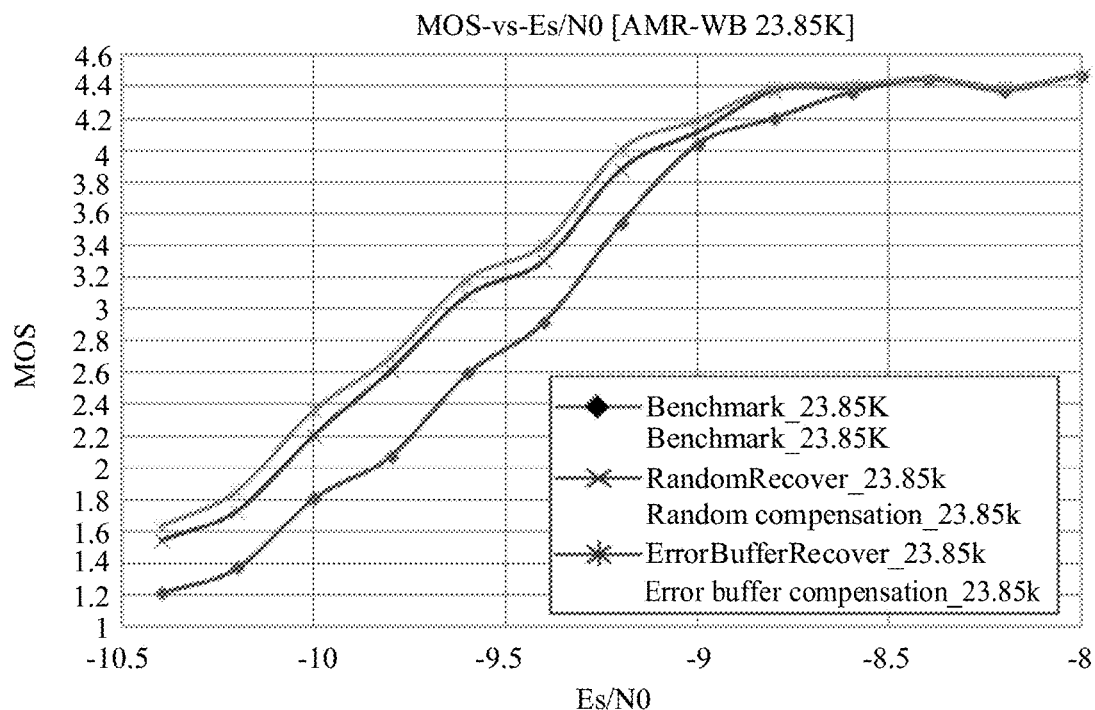
FIG. 9b is a schematic diagram of performance comparison between a data processing method in which data in a data field is obtained based on an incorrectly received MAC PDU and a data processing method through random recovery according to an embodiment of the present invention.

FIG. 9b shows performance comparison between the data processing method (namely, ErrorBufferRecover error buffer recovery) in which the data in the data field is obtained based on the incorrectly received MAC PDU and the data processing method through random recovery (namely, RandomRecover random recovery, the method in the embodiment shown in FIG. 5). It can be seen that the MOS can obtain an obvious gain regardless of which recovery scheme is used. The performance of the recovery scheme in which the data in the data field is obtained based on the incorrectly received MAC PDU is optimal, but complexity is high. Complexity of the random recovery scheme is low, but there is no obvious performance degradation. Therefore, the random recovery scheme is a good compromise.

Figure 10A:
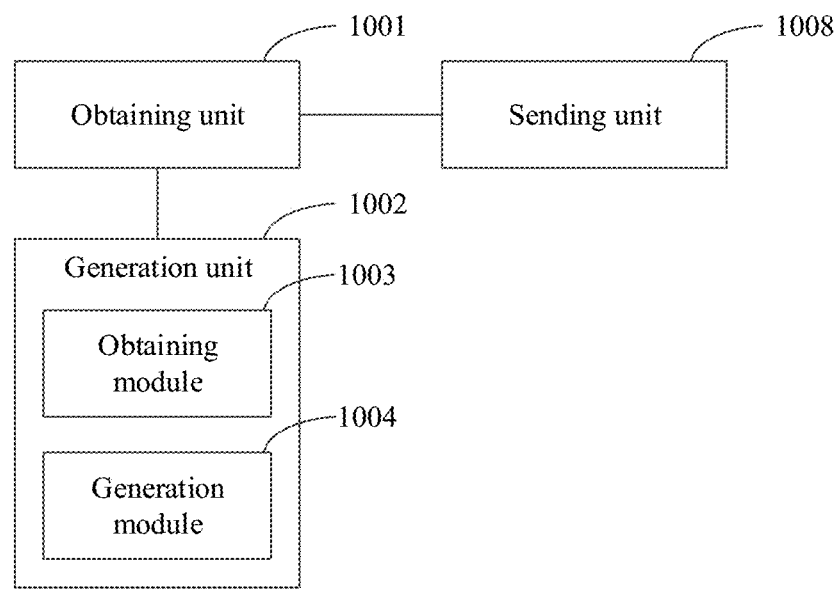
FIG. 10a is a schematic structural diagram of a data processing device according to an embodiment of the present invention.
Figure 10B:
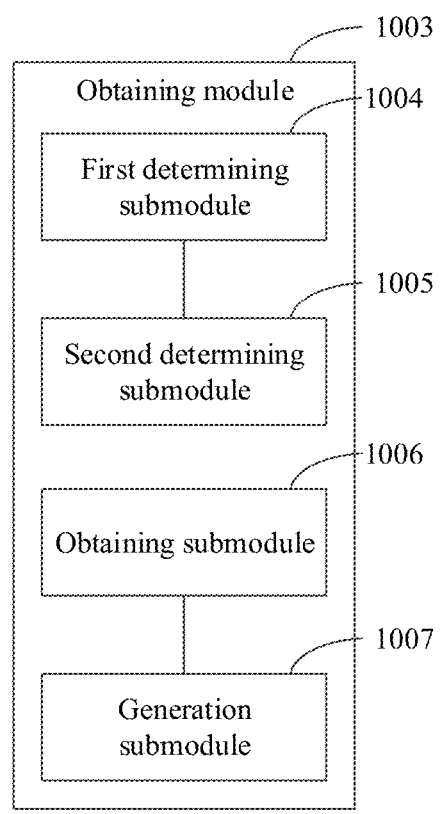

FIG. 10a is a schematic structural diagram of a data processing device according to an embodiment of the present invention. FIG. 10b is a partial schematic structural diagram of a data processing device shown in FIG. 10a. The data processing device may be configured to perform the data processing methods provided in the foregoing embodiments. Referring to FIG. 10a, the data processing device provided in this embodiment of the present invention includes:

an obtaining unit 1001, configured to obtain N correctly received radio link control RLC PDUs in a packet data convergence protocol PDCP protocol data unit PDU; and a generation unit 1002, configured to generate the PDCP PDU based on the N correctly received RLC PDUs, where the PDCP PDU includes M RLC PDUs, N and M are positive integers, and N<M.

Optionally, the generation unit 1002 includes:

an obtaining module 1003, configured to obtain at least one recovered RLC PDU; and a generation module 1004, configured to generate the PDCP PDU based on the N correctly received RLC PDUs and the recovered RLC PDU.

Optionally, data in the recovered RLC PDU is a speech payload obtained from one or more incorrectly received MAC PDUs.

Optionally, referring to FIG. 10b, the obtaining module 1003 includes:

a first determining submodule 1004, configured to: when an RLC PDU in the PDCP PDU is lost, determine receiving moments T1 and T2, where T1 is a receiving moment of a correctly received RLC PDU that is located before the lost RLC PDU in the PDCP PDU, and T2 is a receiving moment of a correctly received RLC PDU that is located after the lost RLC PDU in the PDCP PDU;

a second determining submodule 1005, configured to determine, in the incorrectly received MAC PDUs, a target medium access control MAC PDU whose receiving moment is between T1 and T2, where a receiving moment of an RLC PDU is a receiving moment of a MAC PDU to which the RLC PDU belongs, and the receiving moment of the MAC PDU is a moment recorded when the MAC PDU is received;

an obtaining submodule 1006, configured to obtain a speech payload from the target MAC PDU; and a generation submodule 1007, configured to generate a recovered RLC PDU based on the speech payload, where the recovered RLC PDU is used to replace the lost RLC PDU.

Optionally, data in the recovered RLC PDU is an all-zero sequence or a random bit sequence.

Optionally, data in the N correctly received RLC PDUs includes a significant bit in the PDCP PDU.

Optionally, the device in this embodiment of the present invention further includes a sending unit 1008.

The obtaining unit 1001 is further configured to obtain a MAC PDU corresponding to a non-significant bit in the PDCP PDU.

The sending unit 1008 is configured to: if a quantity of retransmission times of the MAC PDU corresponding to the non-significant bit reaches a quantity of times of retransmission occurring until retransmission is terminated, send an ACK message to a transmit end, where the quantity of times of retransmission occurring until retransmission is terminated is less than a maximum quantity of retransmission times of the MAC PDU.

In conclusion, the obtaining unit 1001 obtains the N correctly received RLC PDUs in the PDCP PDU, and then the generation unit 1002 generates the PDCP PDU based on the N correctly received RLC PDUs. The PDCP PDU includes the M RLC PDUs, N and M are positive integers, and N<M. In this way, the PDCP PDU can be generated based on some correctly received RLC PDUs in the PDCP PDU, and there is no need to assemble all the RLC PDUs to obtain the PDCP PDU. Therefore, even if an RLC PDU that does not need to be used is incorrectly received or lost, generation of the PDCP PDU is not affected.

Figure 11:
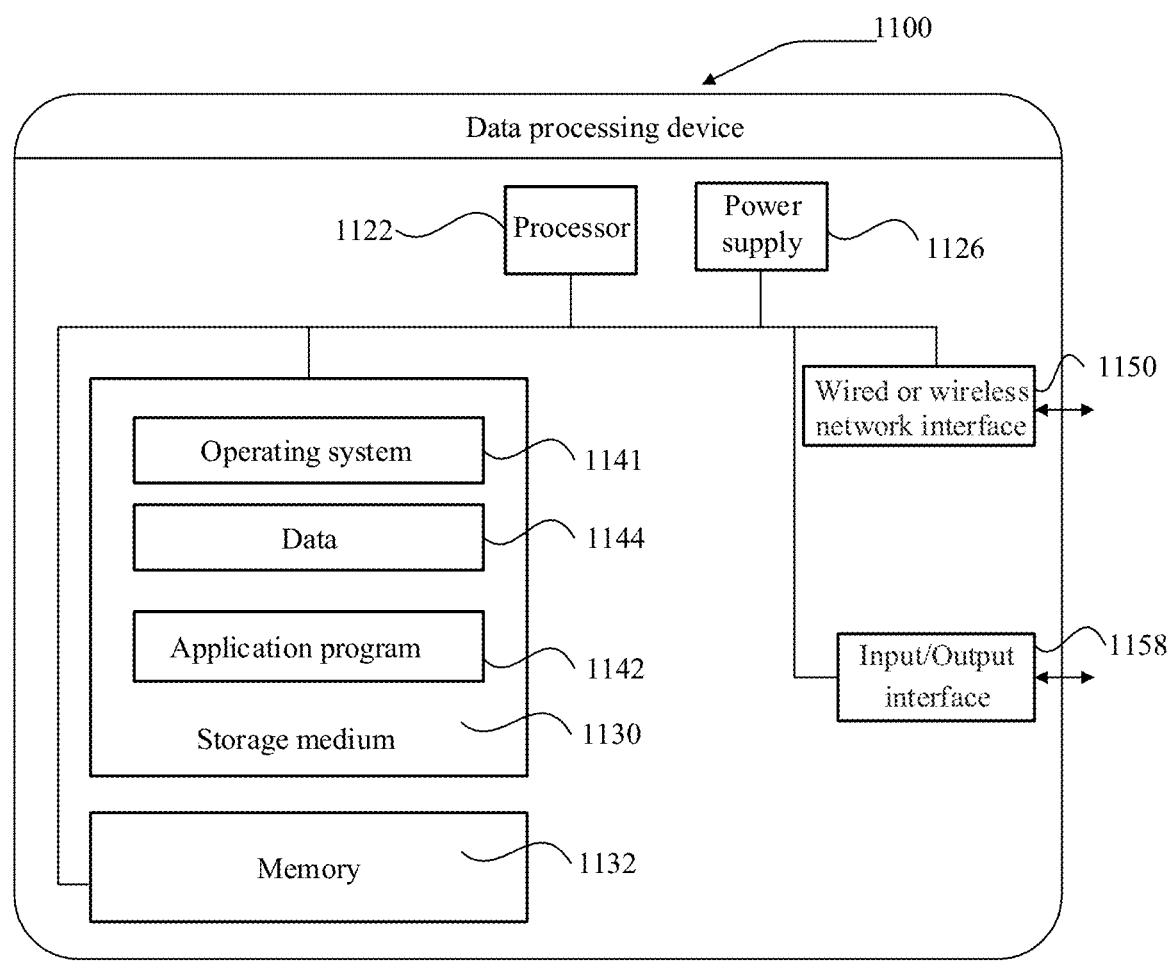
FIG. 11 is a schematic structural diagram of hardware of a data processing device according to an embodiment of the present invention.

FIG. 11 is a schematic structural diagram of hardware of a data processing device according to an embodiment of the present invention. A great difference in the data processing device 1100 may be generated because of configuration or performance difference. The data processing device 1100 may include one or more central processing units (CPU) 1122 (for example, one or more processors), one or more memories 1132, and one or more storage media 1130 (for example, one or more massive storage devices) for storing an application program 1142 or data 1144. The memory 1132 and the storage medium 1130 may be transitory storage or persistent storage. Programs stored in the storage medium 1130 may include one or more modules (not marked in the figure), and each module may include a series of instruction operations on the data processing device. Further, the central processing unit 1122 may be set to communicate with the storage medium 1130, and perform, on the data processing device 1100, the series of instruction operations in the storage medium 1130.

The data processing device 1100 may further include one or more power supplies 1126, one or more wired or wireless network interfaces 1150, one or more input/output interfaces 1158, and/or one or more operating systems 1141, such as Windows Server™, Mac OS X™, Unix™, Linux™, or FreeBSD™.

The steps performed by the data processing device in the foregoing embodiments may be based on the structure of the data processing device shown in FIG. 11. In other words, the data processing device shown in FIG. 11 may be configured to perform the data processing methods in the foregoing embodiments. The function modules of the data processing devices shown in FIG. 10a and FIG. 10b can be integrated on the data processing device shown in FIG. 11.

Specifically, by invoking an operation instruction stored in the memory 1132, the processor 1122 is configured to perform the following steps:

obtaining N correctly received radio link control RLC PDUs in a packet data convergence protocol PDCP protocol data unit PDU; and generating the PDCP PDU based on the N correctly received RLC PDUs, where the PDCP PDU includes M RLC PDUs, N and M are positive integers, and N<M.

Optionally, by invoking the operation instruction stored in the memory 1132, the processor 1122 is configured to perform the following steps:

obtaining at least one recovered RLC PDU; and generating the PDCP PDU based on the N correctly received RLC PDUs and the recovered RLC PDU.

Optionally, data in the recovered RLC PDU is a speech payload obtained from one or more incorrectly received medium access control MAC PDUs.

Optionally, by invoking the operation instruction stored in the memory 1132, the processor 1122 is configured to perform the following steps:

when an RLC PDU in the PDCP PDU is lost, determining receiving moments T1 and T2, where T1 is a receiving moment of a correctly received RLC PDU that is located before the lost RLC PDU in the PDCP PDU, and T2 is a receiving moment of a correctly received RLC PDU that is located after the lost RLC PDU in the PDCP PDU;

determining, in the incorrectly received MAC PDUs, a target medium access control MAC PDU whose receiving moment is between T1 and T2, where a receiving moment of an RLC PDU is a receiving moment of a MAC PDU to which the RLC PDU belongs, and the receiving moment of the MAC PDU is a moment recorded when the MAC PDU is received;

obtaining a speech payload from the target MAC PDU; and generating a recovered RLC PDU based on the speech payload, where the recovered RLC PDU is used to replace the lost RLC PDU.

Optionally, data in the recovered RLC PDU is an all-zero sequence or a random bit sequence.

Optionally, data in the N correctly received RLC PDUs includes a significant bit in the PDCP PDU.

Optionally, by invoking the operation instruction stored in the memory 1132, the processor 1122 is configured to perform the following steps:

obtaining a MAC PDU corresponding to a non-significant bit in the PDCP PDU; and if a quantity of retransmission times of the MAC PDU corresponding to the non-significant bit reaches a quantity of times of retransmission occurring until retransmission is terminated, sending an ACK message to a transmit end, where the quantity of times of retransmission occurring until retransmission is terminated is less than a maximum quantity of retransmission times of the MAC PDU.

In conclusion, the device obtains the N correctly received RLC PDUs in the PDCP PDU, and then generates the PDCP PDU based on the N correctly received RLC PDUs, where the PDCP PDU includes the M RLC PDUs, N and M are positive integers, and N<M. In this way, the PDCP PDU can be generated based on some correctly received RLC PDUs in the PDCP PDU, and there is no need to assemble all the RLC PDUs to obtain the PDCP PDU. Therefore, even if an RLC PDU that does not need to be used is incorrectly received or lost, generation of the PDCP PDU is not affected.

All or some of the foregoing embodiments may be implemented in a form of software, hardware, firmware, or any combination thereof. When software is used to implement the embodiments, the embodiments may be all or partially implemented in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A data processing method, wherein the method comprises:

obtaining N correctly received radio link control (RLC) protocol data units (PDUs) in a packet data convergence protocol (PDCP) PDU, wherein each correctly received RLC PDU is an RLC PDU that belongs to a medium access control (MAC) PDU on which a cyclic redundancy check (CRC) is correct;

generating the PDCP PDU based on the N correctly received RLC PDUs, wherein the PDCP PDU comprises M RLC PDUs, wherein N and M are positive integers, and wherein N<M;

obtaining a MAC PDU corresponding to a non-significant bit in the PDCP PDU; and when a quantity of retransmission times of the MAC PDU corresponding to the non-significant bit reaches a quantity of times of retransmission occurring until retransmission is terminated, sending an ACK message to a transmit end, wherein the quantity of times of retransmission occurring until retransmission is terminated is less than a maximum quantity of retransmission times of the MAC PDU.

2. The method according to claim 1, wherein the generating the PDCP PDU based on the N correctly received RLC PDUs comprises:

obtaining at least one recovered RLC PDU; and generating the PDCP PDU based on the N correctly received RLC PDUs and the recovered RLC PDU.

3. The method according to claim 2, wherein data in the recovered RLC PDU is a speech payload obtained from one or more incorrectly received MAC PDUs.

4. The method according to claim 3, wherein the obtaining at least one recovered RLC PDU comprises:
when an RLC PDU in the PDCP PDU is lost, determining receiving moments T1 and T2, wherein T1 is a receiving moment of a correctly received RLC PDU that is located before the lost RLC PDU in the PDCP PDU, and wherein T2 is a receiving moment of a correctly received RLC PDU that is located after the lost RLC PDU in the PDCP PDU;
determining, in the one or more incorrectly received MAC PDUs, a target MAC PDU whose receiving moment is between T1 and T2, wherein a receiving moment of an RLC PDU is a receiving moment of a MAC PDU to which the RLC PDU belongs, and wherein the receiving moment of the MAC PDU is a moment recorded when the MAC PDU is received;
obtaining a speech payload from the target MAC PDU; and
generating a recovered RLC PDU based on the speech payload, wherein the recovered RLC PDU is used to replace the lost RLC PDU.

5. The method according to claim 2, wherein data in the recovered RLC PDU is an all-zero sequence or a random bit sequence.

6. The method according to claim 1, wherein data in the N correctly received RLC PDUs comprises a significant bit in the PDCP PDU.

7. A data processing device, wherein the device comprises:
a memory storing instructions; and
at least one processor coupled to the memory to execute the instructions to:
obtain N correctly received radio link control (RLC) protocol data units (PDUs) in a packet data convergence protocol (PDCP) PDU, wherein each correctly received RLC PDU is an RLC PDU that belongs to a medium access control (MAC) PDU on which a cyclic redundancy check (CRC) is correct;
generate the PDCP PDU based on the N correctly received RLC PDUs, wherein the PDCP PDU comprises M RLC PDUs, wherein N and M are positive integers, and wherein N<M;
obtain a MAC PDU corresponding to a non-significant bit in the PDCP PDU; and
when a quantity of retransmission times of the MAC PDU corresponding to the non-significant bit reaches a quantity of times of retransmission occurring until retransmission is terminated, send an ACK message to a transmit end, wherein the quantity of times of retransmission occurring until retransmission is terminated is less than a maximum quantity of retransmission times of the MAC PDU.

8. The device according to claim 7, wherein the at least one processor executes the instructions to:
obtain at least one recovered RLC PDU; and
generate the PDCP PDU based on the N correctly received RLC PDUs and the recovered RLC PDU.

9. The device according to claim 8, wherein data in the recovered RLC PDU is a speech payload obtained from one or more incorrectly received MAC PDUs.

10. The device according to claim 9, wherein the at least one processor executes the instructions to:
when an RLC PDU in the PDCP PDU is lost, determine receiving moments T1 and T2, wherein T1 is a receiving moment of a correctly received RLC PDU that is located before the lost RLC PDU in the PDCP PDU, and wherein T2 is a receiving moment of a correctly received RLC PDU that is located after the lost RLC PDU in the PDCP PDU;
determine, in the one or more incorrectly received MAC PDUs, a target MAC PDU whose receiving moment is between T1 and T2, wherein a receiving moment of an RLC PDU is a receiving moment of a MAC PDU to which the RLC PDU belongs, and wherein the receiving moment of the MAC PDU is a moment recorded when the MAC PDU is received;
obtain a speech payload from the target MAC PDU; and
generate a recovered RLC PDU based on the speech payload, wherein the recovered RLC PDU is used to replace the lost RLC PDU.

11. The device according to claim 8, wherein data in the recovered RLC PDU is an all-zero sequence or a random bit sequence.

12. The device according to claim 7, wherein data in the N correctly received RLC PDUs comprises a significant bit in the PDCP PDU.

13. A non-transitory computer readable storage medium comprising instructions which, when executed by one or more processors, cause the one or more processors to perform operations comprising:
obtaining N correctly received radio link control (RLC) protocol data units (PDUs) in a packet data convergence protocol (PDCP) PDU, wherein each correctly received RLC PDU is an RLC PDU that belongs to a medium access control (MAC) PDU on which a cyclic redundancy check (CRC) is correct;
generating the PDCP PDU based on the N correctly received RLC PDUs, wherein the PDCP PDU comprises M RLC PDUs, wherein N and M are positive integers, and wherein N<M;
obtaining a MAC PDU corresponding to a non-significant bit in the PDCP PDU; and
when a quantity of retransmission times of the MAC PDU corresponding to the non-significant bit reaches a quantity of times of retransmission occurring until retransmission is terminated, sending an ACK message to a transmit end, wherein the quantity of times of retransmission occurring until retransmission is terminated is less than a maximum quantity of retransmission times of the MAC PDU.

14. The non-transitory computer readable storage medium according to claim 13, wherein generating the PDCP PDU based on the N correctly received RLC PDUs comprises:
obtaining at least one recovered RLC PDU; and
generating the PDCP PDU based on the N correctly received RLC PDUs and the recovered RLC PDU.

15. The non-transitory computer readable storage medium according to claim 14, wherein data in the recovered RLC PDU is a speech payload obtained from one or more incorrectly received MAC PDUs.

16. The non-transitory computer readable storage medium according to claim 15, wherein obtaining at least one recovered RLC PDU comprises:
determining receiving moments T1 and T2 when an RLC PDU in the PDCP PDU is lost, wherein T1 is a receiving moment of a correctly received RLC PDU that is located before the lost RLC PDU in the PDCP PDU, and wherein T2 is a receiving moment of a correctly received RLC PDU that is located after the lost RLC PDU in the PDCP PDU;

determining, in the one or more incorrectly received MAC PDUs, a target MAC PDU whose receiving moment is between T1 and T2, wherein a receiving moment of an RLC PDU is a receiving moment of a MAC PDU to which the RLC PDU belongs, and wherein the receiving moment of the MAC PDU is a moment recorded when the MAC PDU is received;

obtaining a speech payload from the target MAC PDU; and generating a recovered RLC PDU based on the speech payload, wherein the recovered RLC PDU is used to replace the lost RLC PDU.

17. The non-transitory computer readable storage medium according to claim 14, wherein data in the recovered RLC PDU is an all-zero sequence or a random bit sequence.

18. The non-transitory computer readable storage medium according to claim 13, wherein data in the N correctly received RLC PDUs comprises a significant bit in the PDCP PDU.

* * * * *